(12) United States Patent
Zhang et al.

(10) Patent No.: US 11,378,983 B2
(45) Date of Patent: Jul. 5, 2022

(54) STABLE FLIGHT CONTROL METHOD FOR MULTI-ROTOR UNMANNED AERIAL VEHICLE BASED ON FINITE-TIME NEURODYNAMICS

(71) Applicant: SOUTH CHINA UNIVERSITY OF TECHNOLOGY, Guangzhou (CN)

(72) Inventors: Zhijun Zhang, Guangzhou (CN); Lu'nan Zheng, Guangzhou (CN); Qi Guo, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 264 days.

(21) Appl. No.: 16/636,011

(22) PCT Filed: Nov. 6, 2017

(86) PCT No.: PCT/CN2017/109484
§ 371 (c)(1),
(2) Date: Feb. 2, 2020

(87) PCT Pub. No.: WO2019/024303
PCT Pub. Date: Feb. 7, 2019

(65) Prior Publication Data
US 2021/0141395 A1    May 13, 2021

(30) Foreign Application Priority Data
Aug. 2, 2017 (CN) .................. CN201710650246

(51) Int. Cl.
| | | |
|---|---|---|
| G05D 1/08 | (2006.01) | |
| B64C 39/02 | (2006.01) | |
| G05D 1/10 | (2006.01) | |
| G06N 3/08 | (2006.01) | |

(52) U.S. Cl.
CPC ......... G05D 1/0825 (2013.01); B64C 39/024 (2013.01); G05D 1/0858 (2013.01);
(Continued)

(58) Field of Classification Search
None
See application file for complete search history.

(56) References Cited

U.S. PATENT DOCUMENTS

| 2015/0220829 A1 | 8/2015 | Hunzinger et al. |
| 2016/0034808 A1 | 2/2016 | Alvarez-Icaza Rivera et al. |
| 2020/0372815 A1* | 11/2020 | Kikuchi ................. B64D 45/04 |

FOREIGN PATENT DOCUMENTS

| CN | 104637370 | 5/2015 |
| CN | 105607473 | 5/2016 |
| CN | 106155076 | 11/2016 |
| CN | 106647584 | 5/2017 |
| CN | 106945041 | 7/2017 |

OTHER PUBLICATIONS

Zhang Z, Yu J, Li Y, Zhang X. A new neural-dynamic control method of position and angular stabilization for autonomous quadrotor UAVs, Jul. 24, 2016, 2016 IEEE International Conference on Fuzzy Systems (FUZZ-IEEE), p. 850-855 (Year: 2016).*

(Continued)

*Primary Examiner* — Sze-Hon Kong
*Assistant Examiner* — Davin Seol
(74) *Attorney, Agent, or Firm* — JMB Davis Ben-David (57) ABSTRACT

Provided is a stable flight control method for a multi-rotor unmanned aerial vehicle based on finite-time neurodynamics, comprising the following implementation process: 1) acquiring real-time flight orientation and attitude data through airborne sensors, and analyzing and processing kinematic problems of the aerial vehicle through an airborne processor to establish a dynamics model of the aerial vehicle; 2) designing a finite-time varying-parameter convergence differential neural network solver according to a finite-time varying-parameter convergence differential neurodynamics design method; 3) solving output control parameters of motors of the aerial vehicle through the finite-time varying-parameter convergence differential neural network solver using the acquired real-time orientation and attitude (Continued)

data; and 4) transmitting results to speed regulators of the motors of the aerial vehicle to control the motion of the unmanned aerial vehicle. Based on the finite-time varying-parameter convergence differential neurodynamics method, the invention can approximate the correct solution of the problem in a quick, accurate and real-time way, and can well solve a variety of time-varying problems such as matrix, vector, algebra and optimization.

3 Claims, 3 Drawing Sheets

(52) U.S. Cl.
CPC ............... *G05D 1/102* (2013.01); *G06N 3/08* (2013.01); *B64C 2201/141* (2013.01)

(56) References Cited

OTHER PUBLICATIONS

Kwon, "Transformation Matrix", 1998, Kwon3d, p. 1-4 (Year: 1998).*
Z. Zhang, L. Zheng and Q. Guo, "A Varying-Parameter Convergent Neural Dynamic Controller of Multirotor UAVs for Tracking Time-Varying Tasks," Jun. 2018, in IEEE Transactions on Vehicular Technology, vol. 67, No. 6, p. 4793-4805 (Year: 2018).*
B. Liao et al., "Spot hover control of helicopter and swing control of helicopter sling load by using Zhang-gradient method", 2015, 34th Chinese Control Conference, pp. 506-511 (Year: 2015).*
Y. Zhang et al., "Zhang dynamics and gradient dynamics with tracking-control application", 2012, Fifth International Symposium on Computational Intelligence and Design (ISCID), pp. 235-238 (Year: 2012).*

* cited by examiner

STABLE FLIGHT CONTROL METHOD FOR MULTI-ROTOR UNMANNED AERIAL VEHICLE BASED ON FINITE-TIME NEURODYNAMICS

CROSS-REFERENCE TO RELATED APPLICATIONS

This is the U.S. National Stage of International Patent Application No. PCT/CN/2017/109484 filed on Nov. 6, 2017, which in turn claims the benefit of Chinese Patent Application No. 201710650246.7.

TECHNICAL FIELD

The invention relates to the technical field of flight control of unmanned aerial vehicles, in particular to a stable flight control method for orientation and attitude of a multi-rotor unmanned aerial vehicle based on finite-time neurodynamics.

BACKGROUND ART

In recent years, with the increasing development of science and technology, multi-rotor unmanned aerial vehicles have been widely used in many fields, such as military, agriculture, surveillance missions and detection, because of its low cost, flexible flight and simple mechanical structure. In the research field of multi-rotor unmanned aerial vehicles, a key point is the design of its orientation stability and attitude angle stability controller. In practical application, the stability of position and angle is of great significance. Generally, in the case of remote operation, an operator usually manually and remotely controls an unmanned aerial vehicle, and constantly controls and adjusts the position, height, pitch angle, roll angle, yaw angle, etc. to achieve a target position and attitude or complete a target task. Obviously, in this process, it is required that not only the operator should have rich remote operation experience, but also the unmanned aerial vehicle should have good orientation and attitude angle stability and anti-jamming capability. This is also the original intention of more and more scholars and researchers who are attracted to further study the design method of unmanned aerial vehicle stability controllers. Although the control of a small multi-rotor unmanned aerial vehicle is relatively simple and convenient, the design method of its orientation and angle stability controller is complex, diverse and fascinating. With the development of research, after realizing simple orientation and attitude control of unmanned aerial vehicles, it is meaningful and practical to provide unmanned aerial vehicles with the ability to follow time-varying target values in order to meet the demand of some complex special tasks. For example, when an unmanned aerial vehicle is used in aerial photography, it is often necessary for the aerial vehicle to photograph in a fixed flight attitude in a predetermined orbit, or to photograph the same object in 360° in a predetermined orbit, etc. Therefore, the controller of the unmanned aerial vehicle must have the ability to follow a time-varying target, that is, the controller must have strong robustness, fast convergence rate and stability, so as to ensure that the unmanned aerial vehicle can effectively follow the time-varying target.

SUMMARY OF THE INVENTION

The objective of the invention is to provide a stable flight control method for a multi-rotor unmanned aerial vehicle in order to solve the above-mentioned defects in the prior art.

The object of the invention can be achieved by taking the following technical solutions:

a stable flight control method for a multi-rotor unmanned aerial vehicle based on finite-time neurodynamics, comprising the steps of:

S1, acquiring real-time flight orientation and attitude data of the multi-rotor unmanned aerial vehicle through sensors thereof, and analyzing and processing kinematic problems of the aerial vehicle correspondingly through an airborne processor to establish a dynamics model of the aerial vehicle;

S2, designing a finite-time varying-parameter convergence differential neural network solver for the dynamics model of the multi-rotor aerial vehicle according to a finite-time varying-parameter convergence differential neurodynamics design method;

S3, solving output control parameters of motors of the aerial vehicle through the finite-time varying-parameter convergence differential neural network solver using the acquired real-time orientation and attitude data of the aerial vehicle; and S4, transmitting the solved output control parameters to speed regulators of the motors of the aerial vehicle to control the motion of the unmanned aerial vehicle.

Further, the analyzing and processing kinematic problems of the aerial vehicle correspondingly through an airborne processor to establish a dynamics model of the aerial vehicle of step S1 specifically comprises:

ignoring the effect of air resistance on the aerial vehicle, such that a physical model can be established for the aerial vehicle system:

$$\begin{bmatrix} mI & 0_{3\times3} \\ 0_{3\times3} & J \end{bmatrix} \begin{bmatrix} \dot{v} \\ \dot{w} \end{bmatrix} + \begin{bmatrix} w \times (mv) \\ w \times (Jw) \end{bmatrix} = \begin{bmatrix} F \\ T \end{bmatrix} + \begin{bmatrix} G \\ 0_{3\times1} \end{bmatrix}, \qquad (1)$$

wherein m is a total mass of the aerial vehicle, I is a 3×3 identity matrix, J is a rotational inertia matrix of the aerial vehicle, v and W are a velocity vector and an angular velocity vector of the aerial vehicle in a ground coordinate system, F and G are an axial component vector of an output resultant force of the motors of the aerial vehicle and an axial component vector of gravity of the aerial vehicle, respectively, and T is a rotational torque vector of the aerial vehicle;

establishing a ground coordinate system $X_G$ and an aerial vehicle body coordinate system $X_U$, wherein the ground coordinate system and the body coordinate system have the following relationship: $X_U = K X_G$, in which conversion relationship, K is a rotation conversion matrix between the ground coordinate system and the body coordinate system, which can be expressed as $$K = \begin{bmatrix} C_\theta C_\psi & C_\theta S_\psi & -S_\theta \\ S_\phi S_\theta C_\psi - S_\psi C_\theta & S_\phi S_\theta S_\psi + C_\phi S_\psi & S_\phi C_\theta \\ S_\phi S_\theta C_\psi + C_\phi S_\psi & C_\phi S_\theta S_\psi - S_\phi C_\psi & C_\theta C_\phi \end{bmatrix},$$

wherein $C_\theta$ represents $\cos\theta(t)$, $S_\theta$ represents $\sin\theta(t)$, $\theta(t)$ is the pitch angle, $\psi(t)$ is the yaw angle, and $\phi(t)$ is the roll angle;

according to the coordinate conversion theory, in a translation direction and a rotation direction of the aerial vehicle, basing on the above physical model, such that the following dynamics equation in the aerial vehicle body coordinate system can be obtained $$\begin{cases} \ddot{x} = \dfrac{u_1(t)(\cos\phi(t)\sin\theta(t)\cos\psi(t) + \sin\theta(t)\sin\psi(t))}{m} \\ \ddot{y} = \dfrac{u_1(t)(\sin\phi(t)\sin\theta(t)\cos\psi(t) - \sin\psi(t)\cos\psi(t))}{m} \\ \ddot{z} = \dfrac{u_1(t)\cos\theta(t)\cos\phi(t)}{m} - g \\ \ddot{\phi} = \dfrac{l \cdot u_2(t) + (J_y - J_z)\dot{\psi}(t)\dot{\theta}(t)}{J_y} \\ \ddot{\theta} = \dfrac{l \cdot u_3(t) + (J_z - J_x)\dot{\psi}(t)\dot{\phi}(t)}{J_y} \\ \ddot{\psi} = \dfrac{u_4(t) + (J_x - J_y)\dot{\theta}(t)\dot{\phi}(t)}{J_z} \end{cases} \quad (2)$$

wherein x, y, z are position coordinates of the aerial vehicle in the world coordinate system, respectively, $J_x$, $J_y$ and $J_z$ are rotational inertia of the aerial vehicle in x-axis, y-axis and z-axis directions, respectively, l is an arm length, g is gravitational acceleration, synthesized control parameters $u_1 \sim u_4$ consist of output thrust of the motors of the aerial vehicle and a synthesized torque, $u_1(t)$ is a resultant force in a vertical ascending direction of the aerial vehicle, $u_2(t)$ is a resultant force in a roll angle direction, $u_3(t)$ is a resultant force in a pitch angle direction, and $u_4(t)$ is the synthesized torque in a yaw angle direction.

Further, the designing a finite-time varying-parameter convergence differential neural network solver for the dynamics model of the multi-rotor aerial vehicle according to a finite-time varying-parameter convergence differential neurodynamics design method of step S2 specifically comprises:

by means of the finite-time varying-parameter convergence differential neurodynamics design method, designing a system parameter deviation function of the finite-time varying-parameter convergence differential neural network about the output control parameters $u_1 \sim u_4$ in respect to the z-axis height z(t), the roll angle $\phi(t)$, the pitch angle $\theta(t)$ and the yaw angle $\psi(t)$, respectively; and designing the finite-time varying-parameter convergence differential neural network solver according to the obtained system parameter deviation function of the finite-time varying-parameter convergence differential neural network about the output control parameters $u_1 \sim u_4$, respectively.

Further, the step of by means of the finite-time varying-parameter convergence differential neurodynamics design method, designing a system parameter deviation function of the finite-time varying-parameter convergence differential neural network about the output control parameters $u_1 \sim u_4$ in respect to the z-axis height z(t), the roll angle $\phi(t)$ the pitch angle $\theta(t)$ and the yaw angle $\psi(t)$, respectively, specifically comprises:

S201, for the z-axis height z(t), according to a set target height value and an actual height value $z_T(t)$ in the z-axis direction, defining a deviation function $e_{z1}$ about the actual height value z(t) on a position layer as follows: $e_{z1}(t)=z(t)-z_T(t)$, in order to enable the actual value z(t) to converge to the time-varying target value $z_T(t)$, designing a neurodynamics equation $\dot{e}_{z1}(t)=-\gamma(t)\Phi(e_{z1}(t),t)$ based on a deviation function according to the finite-time varying-parameter convergence differential neurodynamics design method, wherein $\gamma(t)=p+t^p$ is a time-varying parameter representing a regulatory factor for the rate of convergence;

$$\Phi(e_{z1}(t), t) = k_1 \mid e_{z1}(t) \mid^r \text{sign}(e_{z1}(t)) + k_2 e_{z1}(t) + k_3 \mid e_{z1}(t) \mid^{\frac{1}{r}} \text{sign}(e_{z1}(t))$$

according to the deviation function $e_{z1}(t)=z(t)-z_T(t)$, $\dot{e}_{z1}=\dot{z}(t)-\dot{z}_T(t)$ can be obtained; by substituting $e_{z1}(t)$ and $\dot{e}_{z1}(t)$ into $\dot{e}_{z1}(t)=-\gamma(t)\Phi(e_{z1}(t),t)$, we can obtain $$\dot{z}(t)-\dot{z}_T(t)+(t^p+p)\Phi(e_{z1}(t),t)=0; \quad (3)$$

the position layer z(t) can converge to the time-varying target value $z_T(t)$ in a super-exponential manner within a finite time, however, since equation (3) does not contain relevant information about the control parameters $u_1 \sim u_4$, the solution of the control parameters cannot be realized, therefore, it is necessary to further design the deviation function including a velocity layer $\dot{z}(t)$ and an acceleration layer $\ddot{z}(t)$, thus defining $e_{z2}(t)=\dot{z}(t)-\dot{z}_T(t)+(t^p+p)\Phi(e_{z1}(t),t)$; according to the finite-time varying-parameter convergence differential neural network design method, the dynamics equation $\dot{e}_{z2}(t)=-\gamma(t)\Phi(e_{z2}(t),t)$ based on the deviation function can be designed, $$\Phi(e_{z2}(t), t) = k_1 \mid e_{z2}(t) \mid^r \text{sign}(e_{z2}(t)) + k_2 e_{z2}(t) + k_3 \mid e_{z2}(t) \mid^{\frac{1}{r}} \text{sign}(e_{z2}(t))$$

according to $e_{z2}(t)=\dot{z}(t)-\dot{z}_T(t)+(t^p+p)\Phi(e_{z1}(t),t)$, the derivative $\dot{e}_{z2}(t)$ of the deviation function $e_{z2}(t)$ is known as: $\dot{e}_{z2}(t)=\ddot{z}(t)-\ddot{z}_T(t)+(p+t^p)\dot{\Phi}(e_{z1}(t),t)+pt^{p-1}\Phi(e_{z1}(t), t)$, by substituting the above equations about $e_{z2}(t)$ and $\dot{e}_{z2}(t)$ into the equation $\dot{e}_{z2}(t)=-\gamma(t)\Phi(e_{z2}(t),t)$ the following function can be obtained:

$$\ddot{z}(t)-\ddot{z}_T(t)+(p+t^p)\dot{\Phi}(e_{z1}(t),t)+\Phi(e_{z2}(t),t)+pt^{p-1}\Phi(e_{z1}(t),t)=0 \quad (4)$$

when equation (4) is established, the velocity layer $\dot{z}(t)$ will converge to $\overline{z}_T(t)$ within finite time in a super-exponential manner, according to which the deviation function can be considered $$E_z(t)=\ddot{z}(t)-\ddot{z}_T(t)+(p+t^p)\dot{\Phi}(e_{z1}(t),t)+\Phi(e_{z2}(t),t)+pt^{p-1}\Phi(e_{z1}(t),t) \quad (5)$$

in order to obtain an actual model of the neural network, in combination with kinetic equation (2), equation (5) can be rewritten into $$E_z(t)=a_z(t)u_1(t)+b_z(t), \quad (6)$$

$$a_z(t) = \frac{\cos\theta(t)\cos\phi(t)}{m},$$

wherein $b_z(t)=-g-\ddot{z}_T(t)+(p+t^p)\dot{\Phi}(e_{z1}(t),t)+pt^{p-1}\Phi(e_{z1}(t),t)+(p+t^p)\Phi(e_{z2}(t),t)$ that is, the deviation function about the output control parameter $u_1(t)$ is obtained;

S202, for the roll angle $\phi(t)$, in order to reach a target angle $\phi_T(t)$, first defining an error function $e_{\phi1}=\phi(t)-\phi_T(t)$, such that we can obtain $\dot{e}_{\phi1}=\dot{\phi}(t)-\dot{\phi}_T(t)$; since the solution is in an angle layer, according to the finite-time varying-parameter differential neurodynamics design method, we can obtain $\dot{e}_{\phi1}(t)=-\gamma(t)\Phi(e_{\phi1}(t),t)$, $$\Phi(e_{\phi1}(t), t) = k_1 \mid e_{\phi1}(t) \mid^r \text{sign}(e_{\phi1}(t)) + k_2 e_{\phi1}(t) + k_3 \mid e_{\phi1}(t) \mid^{\frac{1}{r}} \text{sign}(e_{\phi1}(t));$$

by substituting the error function $e_{\phi1}(t)=\phi(t)-\phi_T(t)$ and $\dot{e}_{\phi1}=\dot{\phi}(t)-\dot{\phi}_T(t)$ into the equation $\dot{e}_{\phi1}(t)=-\gamma(t)\Phi(e_{\phi1}(t),t)$, we can obtain $$\dot{\phi}(t)-\dot{\phi}_T(t)+(t^p+p)\Phi(e_{\phi1}(t),t)=0, \quad (7)$$

$\phi(t)$ will converge to the target angle $\phi_T(t)$ in a super-exponential manner within finite time; since $\dot{\phi}(t)$ is known, it is necessary to solve the equation involving $\ddot{\phi}(t)$; in order to obtain the equation involving $\ddot{\phi}(t)$, the error function $e_{\phi2}=\dot{\phi}(t)-\dot{\phi}_T(t)+(t^p+p)\Phi(e_{\phi1}(t),t)$ is set by the same method and $\dot{e}_{\phi2}(t)=\ddot{\phi}(t)-\ddot{\phi}_T(t)+(p+t^p)\dot{\Phi}(e_{\phi1}(t),t)+pt^{p-1}\Phi(e_{\phi1}(t),t)$, $$\Phi(e_{\phi2}(t), t) = k_1 |e_{\phi2}(t)|^r \text{sign}(e_{\phi2}(t)) + k_2 e_{\phi2}(t) + k_3 |e_{\phi2}(t)|^{\frac{1}{r}} \text{sign}(e_{\phi2}(t));$$

by substituting the above equations of $e_{\phi2}(t)$ and $\dot{e}_{\phi2}(t)$ into the equation $\dot{e}_{\phi2}(t)-\gamma(t)\Phi(e_{\phi2}(t),t)$ the following function can be obtained:

$$\ddot{\phi}(t)-\ddot{\phi}_T(t)+(p+t^p)\dot{\Phi}(e_{\phi1}(t),t)+\Phi(e_{\phi2}(t),t)+pt^{p-1}\Phi(e_{\phi1}(t),t)=0 \quad (8)$$

when equation (8) is established, the velocity layer $\dot{\phi}(t)$ will converge to $\dot{\phi}_T(t)$ within finite time in a super-exponential manner, according to which the deviation function can be considered $$E_\phi = \ddot{\phi}(t)-\ddot{\phi}_T(t)+(p+t^p)\dot{\Phi}(e_{\phi1}(t),t)+\Phi(e_{\phi2}(t),t)+pt^{p-1}\Phi(e_{\phi1}(t),t) \quad (9)$$

when the aerial vehicle reaches a target state, according to the dynamics model equation, the deviation function can be converted into $$E_\phi(t) = \frac{l}{J_x}u_2(t) + b_\phi(t), \quad (10)$$

wherein $$b_\phi(t) = \frac{(J_y - J_z)\dot{\psi}(t)\dot{\theta}(t)}{J_x} - \ddot{\phi}_T(t) + (p + t^p)\dot{\Phi}(e_{\phi1}(t), t) + pt^{p-1}\Phi(e_{\phi1}(t), t) + (p + t^p)(\Phi(e_{\phi2}(t), t))$$

that is, the deviation function about the output control parameter $u_2(t)$ is obtained;

S203, for the pitch angle $\theta(t)$, in order to reach a target angle $\theta_T(t)$, first defining an error function $e_{\theta1}=\theta(t)-\theta_T(t)$, such that we can obtain $\dot{e}_{\theta1}=\dot{\theta}(t)-\dot{\theta}_T(t)$; since the solution is in an angle layer, according to the finite-time varying-parameter differential neurodynamics design method, we can obtain $\dot{e}_{\theta1}(t)=-\gamma(t)\Phi(e_{\theta1}(t),t)$, $$\Phi(e_{\theta1}(t), t) = k_1 |e_{\theta1}(t)|^r \text{sign}(e_{\theta1}(t)) + k_2 e_{\theta1}(t) + k_3 |e_{\theta1}(t)|^{\frac{1}{r}} \text{sign}(e_{\theta1}(t));$$

by substituting the error function $e_{\theta1}(t)$ and $\dot{e}_{\theta1}(t)$ into the equation $\dot{e}_{\theta1}(t)=-\gamma(t)\Phi(e_{\theta1}(t),t)$, we can obtain $$\dot{\theta}(t)-\dot{\theta}_T(t)+(t^p+p)\Phi(e_{\theta1}(t),t)=0, \quad (11)$$

$\theta(t)$ will converge to the target angle $\theta_T(t)$ in a super-exponential manner within finite time; since $\dot{\theta}(t)$ is known, it is necessary to solve the equation involving $\ddot{\theta}(t)$; in order to obtain the equation involving $\ddot{\theta}(t)$, the error function $e_{\theta2}=\dot{\theta}(t)-\dot{\theta}_T(t)+(t^p+p)\Phi(e_{\theta1}(t),t)$ is set by the same method and $\dot{e}_{\theta2}(t)=\ddot{\theta}(t)-\ddot{\theta}_T(t)+(p+t^p)\dot{\Phi}(e_{\theta1}(t),t)+pt^{p-1}\Phi(e_{\theta1}(t),t)$, $$\Phi(e_{\theta2}(t), t) = k_1 |e_{\theta2}(t)|^r \text{sign}(e_{\theta2}(t)) + k_2 e_{\theta2}(t) + k_3 |e_{\theta2}(t)|^{\frac{1}{r}} \text{sign}(e_{\theta2}(t));$$

by substituting the above equations of $e_{\theta2}(t)$ and $\dot{e}_{\theta2}(t)$ into $\dot{e}_{\varphi2}(t)=-\gamma(t)\Phi(e_{\varphi2}(t),t)$, the following function can be obtained:

$$\ddot{\theta}(t)-\ddot{\theta}_T(t)+(p+t^p)\dot{\Phi}(e_{\theta1}(t),t)+\Phi(e_{\theta2}(t),t)+pt^{p-1}\Phi(e_{\theta1}(t),t)=0 \quad (12)$$

when equation (12) is established, the velocity layer $\dot{\theta}(t)$ will converge to $\dot{\theta}_T(t)$ within finite time in a super-exponential manner, according to which the deviation function can be considered $$E_\theta(t)=\ddot{\theta}(t)-\ddot{\theta}_T(t)+(p+t^p)\dot{\Phi}(e_{\theta1}(t),t)+\Phi(e_{\theta2}(t),t)+pt^{p-1}\Phi(e_{\theta1}(t),t) \quad (13)$$

when the aerial vehicle reaches a target state, according to the dynamics model equation, the deviation function can be converted into $$E_\theta(t) = \frac{l}{J_y}u_3(t) + b_\theta(t), \quad (14)$$

wherein $$b_\theta(t) = \frac{(J_z - J_x)\dot{\psi}(t)\dot{\phi}(t)}{J_y} - \ddot{\theta}_T(t) + (p + t^p)\dot{\Phi}(e_{\theta1}(t), t) + pt^{p-1}\Phi(e_{\theta1}(t), t) + (p + t^p)(\Phi(e_{\theta1}(t), t)),$$

that is, the deviation function about the output control parameter $u_3(t)$ is obtained; and S204, for the yaw angle $\psi(t)$, in order to reach a target angle $\psi_T(t)$, first defining an error function $e_{\psi1}=\psi(t)-\psi_T(t)$, such that we can obtain $\dot{e}_{\psi1}=\dot{\psi}(t)-\dot{\psi}_T(t)$; since the solution is in an angle layer, according to the finite-time varying-parameter differential neurodynamics design method, we can obtain $\dot{e}_{\theta1}(t)=-\gamma(t)\Phi(e_{\psi1}(t),t)$, $$\Phi(e_{\psi1}(t), t) = k_1 |e_{\psi1}(t)|^r \text{sign}(e_{\psi1}(t)) + k_2 e_{\psi1}(t) + k_3 |e_{\psi1}(t)|^{\frac{1}{r}} \text{sign}(e_{\psi1}(t));$$

by substituting the error function $e_{\psi1}(t)$ and $\dot{e}_{\psi1}(t)$ into the equation $\dot{e}_{\psi1}(t)=-\gamma(t)\Phi(e_{\psi1}(t),t)$, we can obtain $$\dot{\psi}(t)-\dot{\psi}_T(t)+(t^p+p)\Phi(e_{\psi1}(t),t)=0 \quad (15)$$

$\psi(t)$ will converge to the target angle $\psi_T(t)$ in a super-exponential manner within finite time; since $\dot{\psi}(t)$ is known, it is necessary to solve the equation involving $\ddot{\psi}(t)$; in order to obtain the equation involving $\ddot{\psi}(t)$, the error function $e_{\psi2}=\dot{\psi}(t)-\dot{\psi}_T(t)+(t^p+p)\Phi(e_{\psi1}(t),t)$ is set by the same method and $$\dot{e}_{\psi2}(t) = \ddot{\psi}(t) - \ddot{\psi}_T(t) + (p + t^p)\dot{\Phi}(e_{\psi1}(t), t) + pt^{p-1}\Phi(e_{\psi1}(t), t),$$

$$\Phi(e_{\psi2}(t), t) = k_1|e_{\psi2}(t)|^r\text{sign}(e_{\psi2}(t)) + k_2 e_{\psi2}(t) + k_3|e_{\psi2}(t)|^{\frac{1}{r}}\text{sign}(e_{\psi2}(t));$$

by substituting the above equations of $e_{\psi2}(t)$ and $\dot{e}_{\psi2}(t)$ into $\dot{e}_{\varphi2}(t)=-\gamma(t)\Phi(e_{\varphi2}(t),t)$, the following function can be obtained:

$$\ddot{\psi}(t)-\ddot{\psi}_T(t)+(p+t^p)\dot{\Phi}(e_{\psi1}(t),t)+\Phi(e_{\psi2}(t),t)+pt^{p-1}\Phi(e_{\psi1}(t),t)=0 \quad (16)$$

when equation (16) is established, the velocity layer $\dot\psi(t)$ will converge to $\dot\psi_T(t)$ within finite time in a super-exponential manner, according to which the deviation function can be considered $$E_\psi(t)=\dot\psi(t)-\dot\psi_T(t)+(p+t^p)\Phi(t),t)+\Phi(e_{\psi 2}(t),t)+pt^{p-1}\Phi(e_{\psi 1}(t),t) \tag{17}$$

when the aerial vehicle reaches a target state, according to the dynamics model equation, the deviation function can be converted into $$E_\psi(t) = \frac{1}{J_z}u_4(t) + b_\psi(t), \tag{18}$$

wherein $$b_\psi(t) = \frac{(J_x - J_y)\dot\phi(t)\dot\theta(t)}{J_z} - \ddot\psi_T(t) + (p+t^p)\Phi(e_{\psi 1}(t), t) + pt^{p-1}\Phi(e_{\psi 1}(t), t) + (p+t^p)(\Phi(e_{\psi 2}(t), t)),$$

that is, the deviation function about the output control parameter $u_4(t)$ is obtained;

Further, the step of designing the finite-time varying-parameter convergence differential neural network solver according to the obtained system parameter deviation function of the finite-time varying-parameter convergence differential neural network about the output control parameters $u_1 \sim u_4$, respectively, specifically comprises:

S211, for the z-axis height z(t), by using the finite-time varying-parameter convergence differential neural network design method, designing $\dot E_z(t)=-\gamma(t)\Phi(E_z(t),t)$, and substituting equation (6) and the derivative $\dot E_z(t)=\dot a_z(t)u_1(t)+a_z(t)\dot u_1(t)+\dot b_z(t)$ so that an implicit dynamics equation of the finite-time varying-parameter convergence differential neural network can be obtained:

$$a_z(t)\dot u_1(t)=-(\dot a_z(t)u_1(t)+\dot b_z(t)+\gamma(t)\Phi(E_z(t),t)) \tag{19}$$

the position z(t) and velocity $\dot z(t)$ will converge to a target position $z_T(t)$ and a target velocity $\dot z_T(t)$, respectively, in a super-exponential manner within finite time;

S212, for the roll angle $\phi(t)$, according to the finite-time varying-parameter convergence differential neurodynamics design method, designing $\dot E_\phi(t)=-\gamma(t)\Phi(E_\phi(t),t)$, and substituting equation (10) and its derivative $$\dot E_\phi(t) = \frac{l}{J_x}\dot u_1(t) + \dot b_\phi(t),$$

so that an implicit dynamics equation of the finite-time varying-parameter convergence differential neural network can be obtained:

$$\frac{l}{J_x}\dot u_2(t) = -\big(\dot b_\phi(t) + \gamma(t)\Phi(E_\phi(t), t)\big) \tag{20}$$

the roll angle $\phi(t)$ and velocity $\dot\phi(t)$ will converge to a target position $\phi_T(t)$ and a target velocity $\dot\phi_T(t)$, respectively, in a super-exponential manner within finite time;

S213, for the pitch angle $\theta(t)$, according to the finite-time varying-parameter convergence differential neurodynamics design method, designing $\dot E_\theta(t)=-\gamma(t)\Phi(E_\phi(t),t)$, and substituting equation (14) and its derivative $$\dot E_\theta(t) = \frac{l}{J_x}\dot u_3(t) + \dot b_\theta(t),$$

so that an implicit dynamics equation of the finite-time varying-parameter convergence differential neural network can be obtained:

$$\frac{l}{J_y}\dot u_3(t) = -\big(\dot b_\theta(t) + \gamma(t)\Phi(E_\theta(t), t)\big) \tag{21}$$

the pitch angle $\theta(t)$ and velocity $\dot\phi(t)$ will converge to a target position $\theta_T(t)$ and a target velocity $\dot\theta_T(t)$, respectively, in a super-exponential manner within finite time;

S214, for the yaw angle $\psi(t)$, according to the finite-time varying-parameter convergence differential neurodynamics design method, designing $\dot E_\psi(t)=-\gamma(t)\Phi(E_\phi(t),t)$, and substituting equation (18) and its derivative $$\dot E_\psi(t) = \frac{l}{J_z}\dot u_4(t) + \dot b_\psi(t),$$

so that an implicit dynamics equation of the finite-time varying-parameter convergence differential neural network can be obtained:

$$\frac{l}{J_z}\dot u_4(t) = -\big(\dot b_\psi(t) + \gamma(t)\Phi(E_\psi(t), t)\big) \tag{22}$$

the pitch angle $\psi(t)$ and velocity $\dot\psi(t)$ will converge to a target position $\psi_T(t)$ and a target velocity $\dot\psi_T(t)$, respectively, in a super-exponential manner within finite time; and S215, solving the synthesized control parameters $u_1 \sim u_4$ which is the control parameters corresponding to the flight demand of the aerial vehicle, according to equations (19), (20), (21) and (22), obtaining the neural network equations of the control parameters $u_1 \sim u_4$ respectively as follows:

$$\begin{cases} \dot u_1(t) = \dfrac{-(\dot a_z(t)u_1(t) + \dot b_z(t) + \gamma\Phi(E_z(t), t))}{a_z(t)} \\ \dot u_2 = -(\dot b_\phi(t) + \gamma(t)\Phi(E_\phi(t), t))\dfrac{J_x}{l} \\ \dot u_3 = -(\dot b_\theta(t) + \gamma(t)\Phi(E_\theta(t), t))\dfrac{J_y}{l} \\ \dot u_4 = -(\dot b_\psi(t) + \gamma(t)\Phi(E_\psi(t), t))J_z \end{cases} \tag{23}$$

and performing different output control assignments with the solved control parameters $u_1 \sim u_4$ according to the structure of and the number of motors of different rotor aerial vehicles.

Compared with the prior art, the invention has the advantages and effects as follows.

The present invention is based on the varying-parameter convergence differential neurodynamics method, is described by using a ubiquitous implicit dynamics model, can fully utilize derivative information of various time-varying parameters from a method and system level, has a certain predictive capability for solving problems, can approximate the correct solution of the problem in a quick, accurate and real-time way, and can well solve a variety of time-varying problems such as matrix, vector, algebra and optimization.

DETAILED DESCRIPTION OF EMBODIMENTS

In order to make the objectives, technical solutions and advantages of embodiments of the invention clearer, the technical solutions in embodiments of the invention will be clearly and completely described below with reference to the accompanying drawings in the embodiments of the invention. Apparently, the described embodiments are a part, but not all of the embodiments of the invention. Based on the embodiments of the invention, all other embodiments obtained by those of ordinary skill in the art without involving any inventive effort fall within the scope of protection of the invention.

Embodiments

Figure 1:
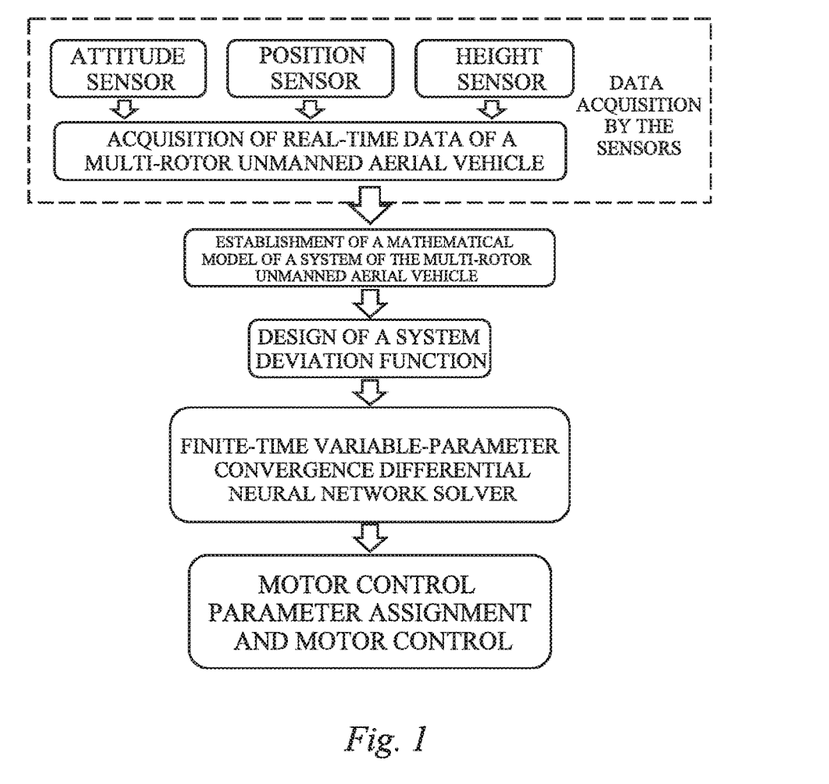
FIG. 1 is a flow chart of a stable flight control method for a multi-rotor unmanned aerial vehicle based on finite-time neurodynamics disclosed by the invention.

FIG. 1 is a flow chart of a stable flight control method for a multi-rotor unmanned aerial vehicle based on finite-time neurodynamics disclosed by the invention. The design of a neural network controller for an aerial vehicle can be achieved through the steps shown in the figure:

As shown in the figure, a stable flight control method for a multi-rotor unmanned aerial vehicle based on finite-time neurodynamics comprises the steps of:

S1, acquiring real-time flight operation data of a multi-rotor unmanned aerial vehicle through an airborne attitude sensor and corresponding height and position sensors thereof, establishing a dynamics model of the aerial vehicle, and analyzing and processing kinematic problems of the aerial vehicle correspondingly through a processor borne by the multi-rotor unmanned aerial vehicle;

S2, designing a finite-time varying-parameter convergence differential neural network solver for the dynamics model of the multi-rotor aerial vehicle according to a finite-time varying-parameter convergence differential neurodynamics design method;

S3, solving output control parameters of motors of the aerial vehicle, through the finite-time varying-parameter convergence differential neural network solver designed in step S2 and using the real-time operation data and target attitude data of the aerial vehicle acquired in step S1; and S4, transmitting results of step S3 to speed regulators of the motors of the aerial vehicle to control the motion of the multi-rotor unmanned aerial vehicle.

Figure 2:
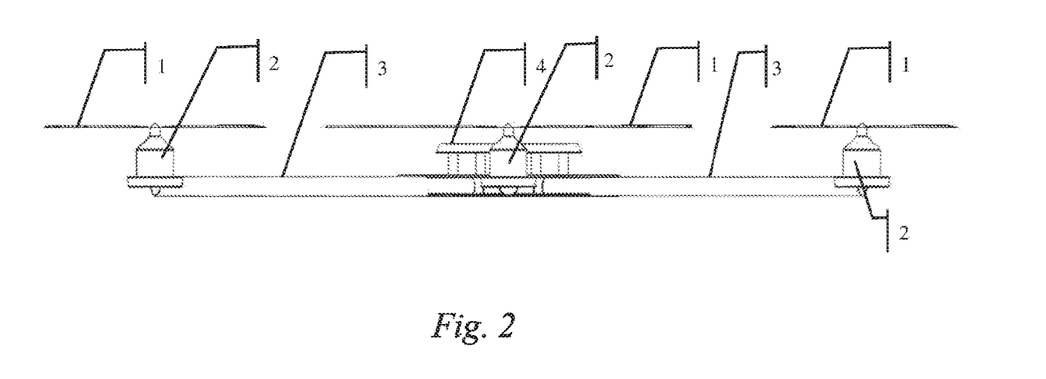
FIG. 2 is a side view showing the structure of the multi-rotor aerial vehicle of the invention.
Figure 3:
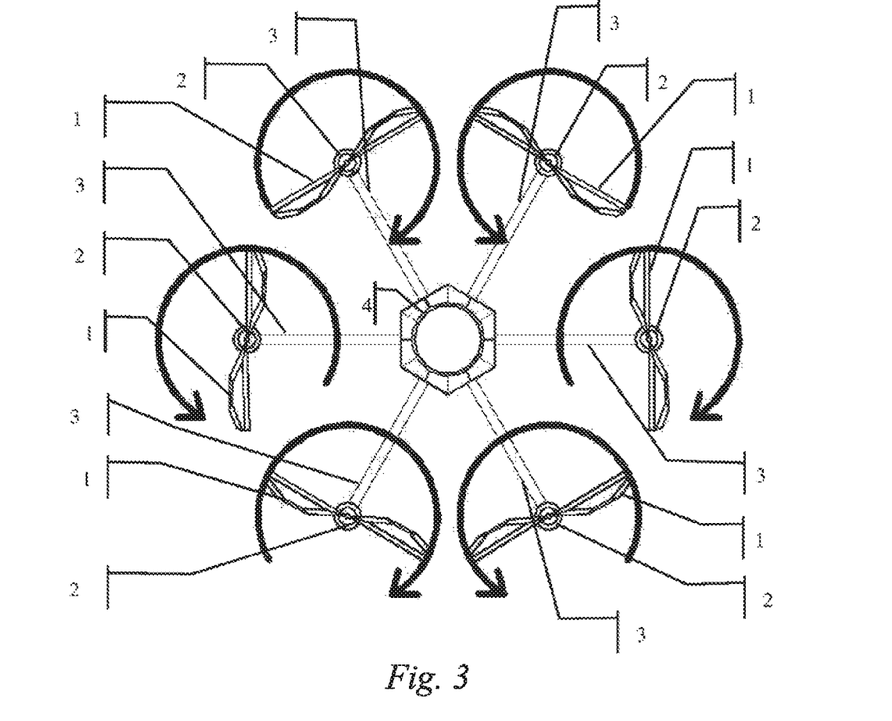
FIG. 3 is a top view showing the structure of the multi-rotor aerial vehicle of the invention.
Figure 4:
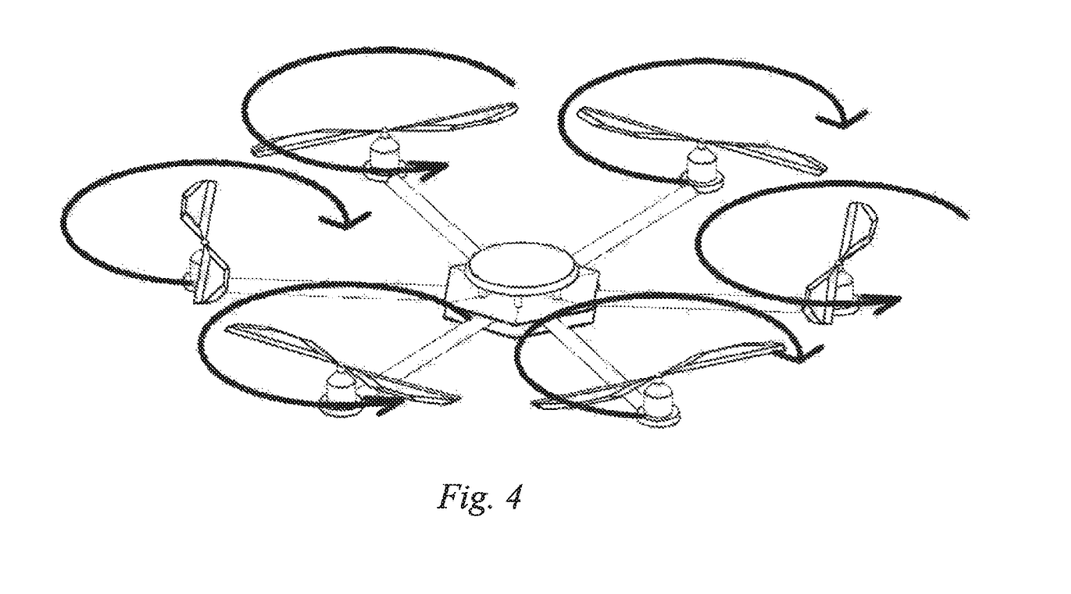
FIG. 4 is a three-dimensional view showing the structure of the multi-rotor aerial vehicle of the invention.

The mechanism shown in FIGS. 2, 3 and 4 is a rotor aerial vehicle structure of multi-rotor aerial vehicles. The structure is a six-rotor aerial vehicle mechanism model, which consists of multi-rotor aerial vehicle propellers 1, brushless motors 2, rotor arms 3 and a body 4. The output resultant force of the six motors and the synthesized rotational torque constitute the control parameters $u_1$~$u_4$ of the multi-rotor aerial vehicle. However, the control design of the invention lies in solving the control parameters of the multi-rotor aerial vehicle through the designed finite-time varying-parameter convergence differential neural network, thereby controlling the flight of the aerial vehicle and realizing the stability control of the aerial vehicle. The directions of rotation arrows in FIGS. 3 and 4 indicate the directions of rotation of the motors, and the combination of the illustrated clockwise and counterclockwise directions of rotation is to achieve mutual offsetting of torques of the motors so as to achieve stable steering control.

Figure 5:
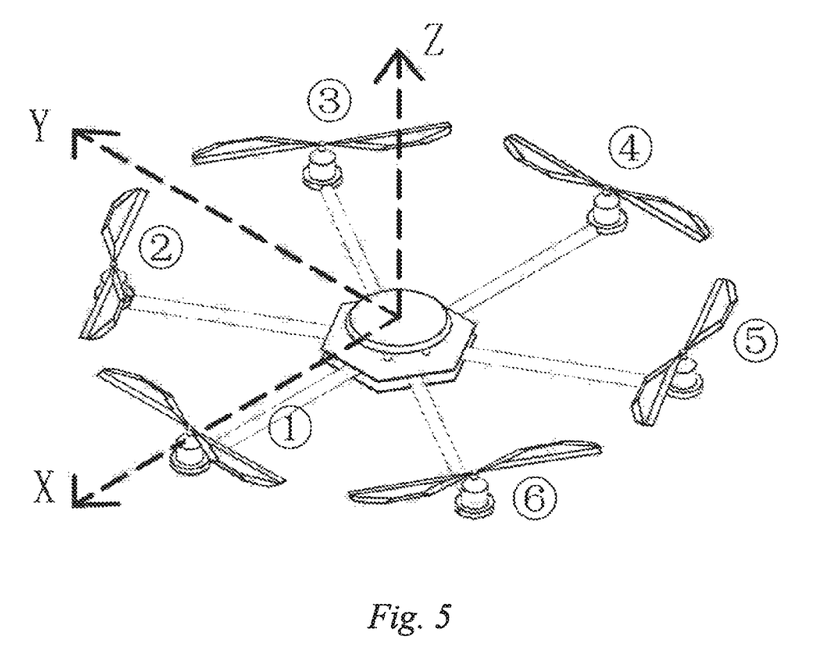
FIG. 5 is a diagram showing a body coordinate system of the multi-rotor aerial vehicle.

FIG. 5 is a schematic diagram of a body coordinate system of the multi-rotor aerial vehicle. According to the body coordinate system, the following definitions are given:

(1) six motors of the six-rotor aerial vehicle are defined No. 1 to No. 6 in the clockwise direction;

(2) the x-axis extends in the direction of No. 1 rotor arm and points to the forward direction of the aerial vehicle through the center of gravity of the body;

(3) the y-axis extends in the direction of the axis of symmetry of No. 2 and No. 3 rotor arms and points to the right motion direction of the aerial vehicle through the center of gravity of the body;

(4) the z-axis extends upwardly perpendicular to the plane of the six rotors and points to the climbing direction of the aerial vehicle through the center of gravity of the body;

(5) the pitch angle $\theta(t)$ is an included angle between the x-axis of the body and the geodetic horizontal plane, and is set to be positive in the downward direction;

(6) the roll angle $\phi(t)$ is an included angle between the z-axis of the body and the geodetic vertical plane passing through the x-axis of the body, and is set to be positive when the body is rightward; and (7) the yaw angle $\psi(t)$ is an included angle between the projection of the x-axis of the body on the geodetic horizontal plane and the x-axis of a geodetic coordinate system, and is set to be positive when the nose of the aerial vehicle is leftward.

According to the relevant steps of the flow chart, detailed algorithm analysis is carried out for the invention. First, with the above definition of the attitude variables of the aerial vehicle, real-time attitude data $\theta(t)$ $\phi(t)$ and $\psi(t)$ of the aerial vehicle may be acquired by sensors such as gyros and accelerometers borne by the multi-rotor aerial vehicle by means of quaternion algebra, Kalman filtering and other algorithms, and position data x(t), y(t) and z(t) of the aerial vehicle in the three-dimensional space is acquired by using altitude sensors and position sensors. The above completes the relevant contents of data acquisition 1 by the sensors in the flow chart.

Based on the previous physical model analysis process, according to different rotor aerial vehicle models, physical model equations and dynamics equations for the aerial vehicle are established, and dynamics analysis may be completed by means of the following aerial vehicle dynamics modeling steps:

ignoring the effect of air resistance on the aerial vehicle, such that a physical model can be established for the aerial vehicle system:

$$\begin{bmatrix} mI & 0_{3\times 3} \\ 0_{3\times 3} & J \end{bmatrix} \begin{bmatrix} \dot{v} \\ \dot{w} \end{bmatrix} + \begin{bmatrix} w \times (mv) \\ w \times (Jw) \end{bmatrix} = \begin{bmatrix} F \\ T \end{bmatrix} + \begin{bmatrix} G \\ 0_{3\times 1} \end{bmatrix}, \quad (1)$$

wherein m is a total mass of the aerial vehicle, I is a 3×3 identity matrix, J is a rotational inertia matrix of the aerial vehicle, v and W are a velocity vector and an angular velocity vector of the aerial vehicle in a ground coordinate system, F and G are an axial component vector of an output resultant force of the motors of the aerial vehicle and an axial component vector of gravity of the aerial vehicle, respectively, and T is a rotational torque vector of the aerial vehicle;

establishing a ground coordinate system $X_G$ and an aerial vehicle body coordinate system $X_U$, wherein the ground coordinate system and the body coordinate system have the following relationship: $X_U=KX_G$, in which conversion relationship, K is a rotation conversion matrix between the ground coordinate system and the body coordinate system, which can be expressed as $$K = \begin{bmatrix} C_\theta C_\psi & C_\theta S_\psi & -S_\theta \\ S_\phi S_\theta C_\psi - S_\psi C_\theta & S_\phi S_\theta S_\psi + C_\phi C_\psi & S_\phi C_\theta \\ S_\phi S_\theta C_\psi - C_\phi S_\psi & C_\phi S_\theta S_\psi - S_\theta C_\psi & C_\theta C_\phi \end{bmatrix},$$

wherein, for the convenience of writing, $C_\theta$ represents cos $\theta(t)$, $S_\theta$ represents sin $\theta(t)$, $\theta(t)$ is the pitch angle, $\psi(t)$ is the yaw angle, and $\phi(t)$ is the roll angle;

according to the coordinate conversion theory, in a translation direction and a rotation direction of the aerial vehicle, basing on the above physical model, such that the following dynamics equation in the aerial vehicle body coordinate system can be obtained $$\begin{cases} \ddot{x} = \dfrac{u_1(t)(\cos\phi(t)\sin\theta(t)\cos\psi(t) + \sin\theta(t)\sin\psi(t))}{m} \\ \ddot{y} = \dfrac{u_1(t)(\sin\phi(t)\sin\theta(t)\cos\psi(t) - \sin\psi(t)\cos\psi(t))}{m} \\ \ddot{z} = \dfrac{u_1(t)\cos\theta(t)\cos\phi(t)}{m} - g \\ \ddot{\phi} = \dfrac{l \cdot u_2(t) + (J_y - J_z)\dot{\psi}(t)\dot{\theta}(t)}{J_y} \\ \ddot{\theta} = \dfrac{l \cdot u_3(t) + (J_z - J_x)\dot{\psi}(t)\dot{\phi}(t)}{J_y} \\ \ddot{\psi} = \dfrac{u_4(t) + (J_x - J_y)\dot{\theta}(t)\dot{\phi}(t)}{J_z} \end{cases}, \quad (2)$$

wherein x, y, z are position coordinates of the aerial vehicle in the world coordinate system, respectively; $J_x$, $J_y$ and $J_z$ are rotational inertia of the aerial vehicle in x-axis, y-axis and z-axis directions, respectively; l is an arm length; g is gravitational acceleration; synthesized control parameters $u_1 \sim u_4$ consist of output thrust of the motors of the aerial vehicle and a synthesized torque, $u_1(t)$ is a resultant force in a vertical ascending direction of the aerial vehicle, $u_2(t)$ is a resultant force in a roll angle direction, $u_3(t)$ is a resultant force in a pitch angle direction, and $u_4(t)$ is the synthesized torque in a yaw angle direction.

The designing a finite-time varying-parameter convergence differential neural network solver for the dynamics model of the multi-rotor aerial vehicle according to a finite-time varying-parameter convergence differential neurodynamics design method of step S2 specifically comprises:

by means of the finite-time varying-parameter convergence differential neurodynamics design method, designing a system parameter deviation function of the finite-time varying-parameter convergence differential neural network about the output control parameters $u_1 \sim u_4$ in respect to the z-axis height z(t), the roll angle $\phi(t)$, the pitch angle $\theta(t)$ and the yaw angle $\psi(t)$, respectively; and designing the finite-time varying-parameter convergence differential neural network solver according to the obtained system parameter deviation function of the finite-time varying-parameter convergence differential neural network about the output control parameters $u_1 \sim u_4$, respectively.

In step S3, the step of by means of the finite-time varying-parameter convergence differential neurodynamics design method, designing a system parameter deviation function of the finite-time varying-parameter convergence differential neural network about the output control parameters $u_1 \sim u_4$ in respect to the z-axis height z(t), the roll angle $\phi(t)$ the pitch angle $\theta(t)$ and the yaw angle $\psi(t)$, respectively, specifically comprises:

for the z-axis height z(t), according to a set target height value and an actual height value $z_T(t)$ in the z-axis direction, defining a deviation function $e_{z1}$ about the actual height value z(t) on a position layer as follows: $e_{z1}(t)=z(t)-z_T(t)$, in order to enable the actual value z(t) to converge to the time-varying target value $z_T(t)$, designing a neurodynamics equation $\dot{e}_{z1}(t)=-\gamma(t)\Phi(e_{z1}(t),t)$ based on a deviation function according to the finite-time varying-parameter convergence differential neurodynamics design method, wherein $\gamma(t)=p+t^p$ is a time-varying parameter representing a regulatory factor for the rate of convergence;

$$\Phi(e_{z1}(t), t) = k_1|e_{z1}(t)|^r \text{sign}(e_{z1}(t)) + k_2 e_{z1}(t) + k_3 |e_{z1}(t)|^{\frac{1}{r}} \text{sign}(e_{z1}(t))$$

according to the deviation function $e_{z1}(t)=z(t)-z_T(t)$, $\dot{e}_{z1}=\dot{z}(t)-\dot{z}_T(t)$ can be obtained; by substituting $e_{z1}(t)=z(t)-z_T(t)$ and $\dot{e}_{z1}=\dot{z}(t)-\dot{z}_T(t)$ into $\dot{e}_{z1}(t)=-\gamma(t)\Phi(e_{z1}(t),t)$, we can obtain $\dot{z}(t)-\dot{z}_T(t)=-(t^p+p)\Phi(e_{z1}(t),t)$, that is $$\dot{z}(t)-\dot{z}_T(t)+(t^p+p)\Phi(e_{z1}(t),t)=0; \quad (3)$$

the position layer z(t) can converge to the time-varying target value $z_T(t)$ in a super-exponential manner within a finite time, however, since equation (3) does not contain relevant information about the control parameters $u_1 \sim u_4$, the solution of the control parameters cannot be realized, therefore, it is necessary to further design the deviation function including a velocity layer $\dot{z}(t)$ and an acceleration layer $\ddot{z}(t)$, thus defining $e_{z2}(t)=\dot{z}(t)-\dot{z}_T(t)+(t^p+p)\Phi(e_{z1}(t),t)$; according to the finite-time varying-parameter convergence differential neural network design method, the dynamics equation $\dot{e}_{z2}(t)=-\gamma(t)\Phi(e_{z2}(t),t)$ based on the deviation function can be designed, $$\Phi(e_{z2}(t), t) = k_1|e_{z2}(t)|^r \text{sign}(e_{z2}(t)) + k_2 e_{z2}(t) + k_3 |e_{z2}(t)|^{\frac{1}{r}} \text{sign}(e_{z2}(t))$$

according to $e_{z2}(t)=\dot{z}(t)-\dot{z}_T(t)+(t^p+p)\Phi(e_{z1}(t),t)$ the derivative $\dot{e}_{z2}(t)$ of the deviation function $e_{z2}(t)$ is known as: $\dot{e}_{z2}(t)=\ddot{z}(t)-\ddot{z}_T(t)+(p+t^p)\dot{\Phi}(e_{z1}(t),t)+pt^{p-1}\Phi(e_{z1}(t),t)$, by substituting the above equations about $e_{z2}(t)$ and $\dot{e}_{z2}(t)$ into the equation $\dot{e}_{\phi2}(t)=-\gamma(t)\Phi(e_{\phi2}(t)t)$, the following function can be obtained:

$$\ddot{z}(t)-\ddot{z}_T(t)+(p+t^p)\dot{\Phi}(e_{z1}(t),t)+\Phi(e_{z2}(t),t)+pt^{p-1}\Phi(e_{z1}(t),t)=0 \quad (4)$$

when equation (4) is established, the velocity layer $\dot{z}(t)$ will converge to $\dot{z}_T(t)$ within finite time in a super-exponential manner, according to which the deviation function can be considered $$E_z(t)=\ddot{z}(t)-\ddot{Z}_T(t)+(p+t^p)\dot{\Phi}(e_{z1}(t),t)+\Phi(e_{z2}(t),t)+pt^{p-1}\Phi(e_{z1}(t),t) \quad (5)$$

in order to obtain an actual model of the neural network, in combination with kinetic equation (2), equation (5) can be rewritten into $$E_z(t)=a_z(t)u_1(t)+b_z(t), \quad (6)$$

wherein $$a_z(t) = \frac{\cos\theta(t)\cos\phi(t)}{m},$$

$b_z(t)=-g-\ddot{z}_T(t)+(p+t^p)\dot{\Phi}(e_{z1}(t),t)+pt^{p-1}\Phi(e_{z1}(t),t)+(p+t^p)\Phi(e_{z2}(t),t)$ that is, the deviation function about the output control parameter $u_1(t)$ is obtained;

for the roll angle $\phi(t)$, in order to reach a target angle $\phi_T(t)$, first defining an error function $e_{\phi 1}=\phi(t)-\phi_T(t)$, such that we can obtain $\dot{e}_{\phi 1}=\dot{\phi}(t)-\dot{\phi}_T(t)$; since the solution is in an angle layer, according to the finite-time varying-parameter differential neurodynamics design method, we can obtain $\dot{e}_{\phi 1}(t)=-\gamma(t)\Phi(e_{\phi 1}(t),t)$, $$\Phi(e_{\phi 1}(t),t) = k_1|e_{\phi 1}(t)|^r \text{sign}(e_{\phi 1}(t)) + k_2 e_{\phi 1}(t) + k_3|e_{\phi 1}(t)|^{\frac{1}{r}}\text{sign}(e_{\phi 1}(t));$$

by substituting the error function $e_{\phi 1}(t)$ and $\dot{e}_{\phi 1}(t)$ into the equation $\dot{e}_{\phi 1}(t)=-\gamma(t)\Phi(e_{\phi 1}(t)t)$, we can obtain $$\dot{\phi}(t)-\dot{\phi}_T(t)+(t^p+p)\Phi(e_{\phi 1}(t),t)=0, \quad (7)$$

$\phi(t)$ will converge to the target angle $\phi_T(t)$ in a super-exponential manner within finite time; since $\dot{\phi}(t)$ is known, it is necessary to solve the equation involving $\ddot{\phi}(t)$; in order to obtain the equation involving $\ddot{\phi}(t)$, the error function $e_{\phi 2}=\dot{\phi}(t)-\dot{\phi}_T(t)+(t^p+p)\Phi(e_{\phi 1}(t),t)$ is set by the same method and $\dot{e}_{\phi 2}(t)=\ddot{\phi}(t)-\ddot{\phi}_T(t)+(p+t^p)\dot{\Phi}(e_{\phi 1}(t),t)+pt^{p-1}\Phi(e_{\phi 1}(t),t)$, $$\Phi(e_{\phi 2}(t),t) = k_1|e_{\phi 2}(t)|^r \text{sign}(e_{\phi 2}(t)) + k_2 e_{\phi 2}(t) + k_3|e_{\phi 2}(t)|^{\frac{1}{r}}\text{sign}(e_{\phi 2}(t));$$

by substituting the above equations of $e_{\phi 2}(t)$ and $\dot{e}_{\phi 2}(t)$ into $\dot{e}_{\phi 2}(t)=-\gamma(t)\Phi(e_{\phi 2}(t),t)$, the following function can be obtained:

$$\ddot{\phi}(t)-\ddot{\phi}_T(t)+(p+t^p)((e_{\phi 1}(t),t)+\varphi(e_{\phi 2}(t),t)+pt^{p-1}\Phi(e_{\phi 1}(t),t)=0 \quad (8)$$

when equation (8) is established, the velocity layer $\dot{\phi}(t)$ will converge to $\dot{\phi}_T(t)$ within finite time in a super-exponential manner, according to which the deviation function can be considered $$E_\phi=\ddot{\phi}(t)-\ddot{\phi}_T(t)+(p+t^p)\dot{\Phi}(e_{\phi 1}(t),t)+\Phi(e_{\phi 2}(t),t)+pt^{p-1}\Phi(e_{\phi 1}(t),t) \quad (9)$$

when the aerial vehicle reaches a target state, according to the dynamics model equation, the deviation function can be converted into $$E_\phi(t) = \frac{l}{J_x}u_2(t)+b_\phi(t), \quad (10)$$

wherein $$b_\phi(t) = \frac{(J_y-J_z)\dot{\psi}(t)\dot{\theta}(t)}{J_x} - \ddot{\phi}_T(t) + $$
$$(p+t^p)\dot{\Phi}(e_{\phi 1}(t),t)+pt^{p-1}\Phi(e_{\phi 1}(t),t)+(p+t^p)(\Phi(e_{\phi 2}(t),t)),$$

that is, the deviation function about the output control parameter $u_2(t)$ is obtained; for the pitch angle $\theta(t)$, in order to reach a target angle $\theta_T(t)$, first defining an error function $e_{\theta 1}=\theta(t)-\theta_T(t)$, such that we can obtain $\dot{e}_{\theta 1}=\dot{\theta}(t)-\dot{\theta}_T(t)$; since the solution is in an angle layer, according to the finite-time varying-parameter differential neurodynamics design method, we can obtain $\dot{e}_{\theta 1}(t)=-\gamma(t)\Phi(e_{\theta 1}(t),t)$, $$\Phi(e_{\theta 1}(t),t) = k_1|e_{\theta 1}(t)|^r \text{sign}(e_{\theta 1}(t)) + k_2 e_{\theta 1}(t) + k_3|e_{\theta 1}(t)|^{\frac{1}{r}}\text{sign}(e_{\theta 1}(t));$$

by substituting the error function $e_{\theta 1}(t)$ and $\dot{e}_{\theta 1}(t)$ into the equation $\dot{e}_{\theta 1}(t)=-\gamma(t)\Phi(e_{\theta 1}(t),t)$, we can obtain $$\dot{\theta}(t)-\dot{\theta}_T(t)+(t^p+p)\Phi(e_{\theta 1}(t),t)=0, \quad (11)$$

$\theta(t)$ will converge to the target angle $\theta_T(t)$ in a super-exponential manner within finite time; since $\dot{\theta}(t)$ is known, it is necessary to solve the equation involving $\ddot{\theta}(t)$; in order to obtain the equation involving $\ddot{\theta}(t)$, the error function $e_{\theta 2}=\dot{\theta}(t)-\dot{\theta}_T(t)+(t^p+p)\Phi(e_{\theta 1}(t),t)$ is set by the same method and $\dot{e}_{\theta 2}(t)=\ddot{\theta}(t)-\ddot{\theta}_T(t)+(p+t^p)\dot{\Phi}(e_{\theta 1}(t),t)+pt^{p-1}\Phi((e_{\theta 1}(t),t)$ $$\Phi(e_{\theta 2}(t),t) = k_1|e_{\theta 2}(t)|^r \text{sign}(e_{\theta 2}(t)) + k_2 e_{\theta 2}(t) + k_3|e_{\theta 2}(t)|^{\frac{1}{r}}\text{sign}(e_{\theta 2}(t));$$

by substituting the above equations of $e_{\theta 2}(t)$ and $\dot{e}_{\theta 2}(t)$ into $\dot{e}_{\varphi 2}(t)=-\gamma(t)\Phi(e_{\varphi 2}(t),t)$, the following function can be obtained:

$$\ddot{\theta}(t)-\ddot{\theta}_T(t)+(p+t^p)(e_{\theta 1}(t),t)+\Phi(e_{\theta 2}(t),t)+pt^{p-1}\Phi(e_{\theta 1}(t),t)=0 \quad (12)$$

when equation (12) is established, $\dot{\theta}(t)$ will converge to $\dot{\theta}_T(t)$ within finite time in a super-exponential manner, according to which the deviation function is considered $$E_\theta(t)=\ddot{\theta}(t)-\ddot{\theta}_T(t)+(p+t^p)\dot{\Phi}(e_{\theta 1}(t),t)+\Phi(e_{\theta 2}(t),t)+pt^{p-1}\Phi(e_{\theta 1}(t),t) \quad (13)$$

when the aerial vehicle reaches a target state, according to the dynamics model equation, the deviation function can be converted into $$E_\theta(t) = \frac{l}{J_y}u_3(t)+b_\theta(t), \quad (14)$$

wherein $$b_\theta(t) = \frac{(J_z-J_x)\dot{\psi}(t)\dot{\theta}(t)}{J_y} - \ddot{\phi}_T(t) + $$
$$(p+t^p)\dot{\Phi}(e_{\theta 1}(t),t)+pt^{p-1}\Phi(e_{\theta 1}(t),t)+(p+t^p)(\Phi(e_{\theta 2}(t),t)),$$

that is, the deviation function about the output control parameter $u_3(t)$ is obtained;

for the yaw angle $\psi(t)$, in order to reach a target angle $\psi_T(t)$, first defining an error function $e_{\psi 1}=\psi(t)-\psi_T(t)$, such that we can obtain $\dot{e}_{\psi 1}=\dot{\psi}(t)-\dot{\psi}_T(t)$; since the solution is in an angle layer, according to the finite-time varying-parameter differential neurodynamics design method, we can obtain, $\dot{e}_{\psi 1}(t)=-\gamma(t)\Phi(e_{\psi 1}(t),t)$, $$\Phi(e_{\psi 1}(t), t) = k_1|e_{\psi 1}(t)|^r \text{sign}(e_{\psi 1}(t)) + k_2 e_{\psi 1}(t) + k_3 |e_{\psi 1}(t)|^{\frac{1}{r}} \text{sign}(e_{\psi 1}(t));$$

by substituting the error function $e_{\psi 1}(t)$ and $\dot{e}_{\psi 1}(t)$ into the equation $\dot{e}_{\psi 1}(t)=-\gamma(t)\Phi(e_{\psi 1}(t),t)$, we can obtain $$\dot{\psi}(t)-\dot{\psi}_T(t)+(t^p+p)\Phi(e_{\psi 1}(t),t)=0, \quad (15)$$

$\psi(t)$ will converge to the target angle $\psi_T(t)$ in a super-exponential manner within finite time; since $\dot{\psi}(t)$ is known, it is necessary to solve the equation involving $\ddot{\psi}(t)$; in order to obtain the equation involving $\ddot{\psi}(t)$, the error function $e_{\psi 2}=\dot{\psi}(t)-\dot{\psi}_T(t)+(t^p+p)\Phi(e_{\psi 1}(t),t)$ is set by the same method and $$\dot{e}_{\psi 2} = \ddot{\psi}(t) - \ddot{\psi}_T(t) + (p + t^p)\Phi(e_{\psi 1}(t), t) + pt^{p-1}\Phi(e_{\psi 1}(t), t),$$

$$\Phi(e_{\psi 2}(t), t) = k_1|e_{\psi 2}(t)|^r \text{sign}(e_{\psi 2}(t)) + k_2 e_{\psi 2}(t) + k_3 |e_{\psi 2}(t)|^{\frac{1}{r}} \text{sign}(e_{\psi 2}(t));$$

by substituting the above equations of $e_{\psi 2}(t)$ and $\dot{e}_{\psi 2}(t)$ into $\dot{e}_{\varphi 2}(t)=-\gamma(t)\Phi(e_{\varphi 2}(t),t)$, the following function can be obtained:

$$\ddot{\psi}(t)-\ddot{\psi}_T(t)+(p+t^p)\dot{\Phi}(e_{\psi 1}(t),t)+\Phi(e_{\psi 2}(t),t)+pt^{p-1}\Phi(e_{\psi 1}(t),t)=0 \quad (16)$$

when equation (16) is established, the velocity layer $\dot{\psi}(t)$ will converge to $\dot{\psi}_T(t)$ within finite time in a super-exponential manner, according to which the deviation function can be considered $$E_{\psi}(t)=\ddot{\psi}(t)-\ddot{\psi}_T(t)+(p+t^p)\dot{\Phi}(e_{\psi 1}(t),t)+\Phi(e_{\psi 2}(t),t)+pt^{p-1}\Phi(e_{\psi 1}(t),t) \quad (17)$$

when the aerial vehicle reaches a target state, according to the dynamics model equation, the deviation function can be converted into $$E_{\psi}(t) = \frac{1}{J_z}u_4(t) + b_{\psi}(t), \quad (18)$$

wherein $$b_{\psi}(t) = \frac{(J_x - J_y)\dot{\phi}(t)\dot{\theta}(t)}{J_z} - \ddot{\psi}_T(t) + (p + t^p)\dot{\Phi}(e_{\psi 1}(t), t) + pt^{p-1}\Phi(e_{\psi 1}(t), t) + (p + t^p)(\Phi(e_{\psi 2}(t), t)),$$

that is, the deviation function about the output control parameter $u_4(t)$ is obtained;

wherein, in step S4, the step of designing the finite-time varying-parameter convergence differential neural network solver according to the obtained system parameter deviation function of the finite-time varying-parameter convergence differential neural network about the output control parameters $u_1$~$u_4$, respectively, specifically comprises:

for the z-axis height z(t), by using the finite-time varying-parameter convergence differential neural network design method, designing $\dot{E}_z(t)=-\gamma(t)\Phi(E_z(t),t)$, and substituting equation (6) and its derivative $\dot{E}_z(t)=\dot{a}_z(t)u_1(t)+a_z(t)\dot{u}_1(t)+\dot{b}_z(t)$, so that an implicit dynamics equation of the finite-time varying-parameter convergence differential neural network can be obtained:

$$a_z(t)\dot{u}_1(t)=-(\dot{a}_z(t)u_1(t)+\dot{b}_z(t)+\gamma(t)\Phi(E_z(t),t)) \quad (19)$$

the position z(t) and $\dot{z}(t)$ will converge to a target $z_T(t)$ and $\dot{z}_T(t)$, respectively, in a super-exponential manner within finite time;

for the roll angle $\phi(t)$, according to the finite-time varying-parameter convergence differential neurodynamics design method, designing $\dot{E}_\phi(t)=-\gamma(t)\Phi(E_\phi(t),t)$, and substituting equation (10) and its derivative $$\dot{E}_\phi(t) = \frac{l}{J_x}\dot{u}_1(t) + \dot{b}_\phi(t),$$

so that an implicit dynamics equation of the finite-time varying-parameter convergence differential neural network can be obtained:

$$\frac{l}{J_x}\dot{u}_2(t) = -\left(\dot{b}_\phi(t) + \gamma(t)\Phi(E_\phi(t), t)\right) \quad (20)$$

the roll angle $\phi(t)$ and $\dot{\phi}(t)$ will converge to a target $\phi_T(t)$ and $\dot{\phi}_T(t)$, respectively, in a super-exponential manner within finite time;

for the pitch angle $\theta(t)$, according to the finite-time varying-parameter convergence differential neurodynamics design method, designing $\dot{E}_\theta(t)=-\gamma(t)\Phi(E_\theta(t),t)$, and substituting equation (14) and its derivative $$\dot{E}_\theta(t) = \frac{l}{J_y}\dot{u}_3(t) + \dot{b}_\theta(t),$$

so that an implicit dynamics equation of the finite-time varying-parameter convergence differential neural network can be obtained:

$$\frac{l}{J_y}\dot{u}_3(t) = -\left(\dot{b}_\theta(t) + \gamma(t)\Phi(E_\theta(t), t)\right) \quad (21)$$

the pitch angle $\theta(t)$ and $\dot{\theta}(t)$ will converge to a target $\theta_T(t)$ and $\dot{\theta}_T(t)$, respectively, in a super-exponential manner within finite time; and for the yaw angle $\psi(t)$, according to the finite-time varying-parameter convergence differential neurodynamics design method, designing $\dot{E}_\psi(t)=-\gamma(t)\Phi(E_\psi(t),t)$, and substituting equation (18) and its derivative $$\dot{E}_\psi(t) = \frac{1}{J_z}\dot{u}_4(t) + \dot{b}_\psi(t),$$

so that an implicit dynamics equation of the finite-time varying-parameter convergence differential neural network can be obtained:

$$\frac{l}{J_z}\dot{u}_4(t) = -\left(\dot{b}_\psi(t) + \gamma(t)\Phi(E_\psi(t), t)\right) \quad (22)$$

the pitch angle ψ(t) and ψ̇(t) will converge to a target ψ_T(t) and ψ̇_T(t). respectively, in a super-exponential manner within finite time; and solving the synthesized control parameters u_1~u_4 which is the control parameters corresponding to the flight demand of the aerial vehicle, according to equations (19), (20), (21) and (22), obtaining the neural network equations of the control parameters u_1~u_4 respectively as follows:

$$\begin{cases} \dot{u}_1(t) = \dfrac{-(\dot{a}_z(t)u_1(t) + \dot{b}_z(t) + \gamma(t)\Phi(E_z(t), t))}{a_z(t)} \\ \dot{u}_2 = -(b_\phi(y) + \gamma(t)\Phi(E_\phi(t), t))\dfrac{J_x}{l} \\ \dot{u}_3 = -(b_\theta(t) + \gamma(t)\Phi(E_\theta(t), t))\dfrac{J_y}{l} \\ \dot{u}_4 = -(b_\psi(t) + \gamma(t)\Phi(E_\psi(t), t))J_z \end{cases} \quad (23)$$

and performing different output control assignments with the solved control parameters u_1(t)~u_4(t) according to the structure of and the number of motors of different rotor aerial vehicles.

According to the control parameters u_1~u_4 obtained in the above-mentioned neural network solving process, with regard to structures and motor numbers of different aerial vehicles, each motor is controlled through corresponding motor control parameter assignment, thus completing the motor control parameter assignment and motor control in the flow chart. According to the above steps, the invention can be achieved.

To sum up, the invention firstly acquires real-time flight orientation and attitude data of the multi-rotor unmanned aerial vehicle through sensors thereof, and analyzes and processes kinematic problems of the aerial vehicle correspondingly through an airborne processor to establish a dynamics model of the aerial vehicle; then, designs a finite-time varying-parameter convergence differential neural network solver for the dynamics model of the multi-rotor aerial vehicle according to a finite-time varying-parameter convergence differential neurodynamics design method; next, solves output control parameters of motors of the aerial vehicle through the finite-time varying-parameter convergence differential neural network solver using the acquired real-time orientation and attitude data of the aerial vehicle; and finally, transmits results to speed regulators of the motors of the aerial vehicle to control the motion of the unmanned aerial vehicle. Based on the finite-time varying-parameter convergence differential neurodynamics method, the invention can approximate the correct solution of the problem in a quick, accurate and real-time way, and can well solve a variety of time-varying problems such as matrix, vector, algebra and optimization.

The above-described embodiments are preferred embodiments of the invention; however, the embodiments of the invention are not limited to the above-described embodiments, and any other change, modification, replacement, combination, and simplification made without departing from the spirit, essence, and principle of the invention should be an equivalent replacement and should be included within the scope of protection of the invention.

The invention claimed is:
1. A stable flight control method for a multi-rotor unmanned aerial vehicle based on finite-time neurodynamics, the control method comprising the steps of:
    S1, acquiring real-time flight orientation and attitude data of the multi-rotor unmanned aerial vehicle through sensors thereof, and analyzing and processing kinematic problems of the aerial vehicle correspondingly through an airborne processor to establish a dynamics model of the aerial vehicle;
    S2, designing a finite-time varying-parameter convergence differential neural network solver for the dynamics model of the multi-rotor aerial vehicle according to a finite-time varying-parameter convergence differential neurodynamics design method;
    S3, solving output control parameters of motors of the aerial vehicle through the finite-time varying-parameter convergence differential neural network solver using the acquired real-time orientation and attitude data of the aerial vehicle; and
    S4, transmitting the solved output control parameters to speed regulators of the motors of the aerial vehicle to control the motion of the unmanned aerial vehicle;
    wherein the analyzing and processing kinematic problems of the aerial vehicle correspondingly through an airborne processor to establish a dynamics model of the aerial vehicle of step S1 specifically comprises:
    ignoring the effect of air resistance on the aerial vehicle, such that a physical model can be established for the aerial vehicle system:

$$\begin{bmatrix} mI & 0_{3\times 3} \\ 0_{3\times 3} & J \end{bmatrix} \begin{bmatrix} \dot{v} \\ \dot{w} \end{bmatrix} + \begin{bmatrix} w \times (mv) \\ w \times (Jw) \end{bmatrix} = \begin{bmatrix} F \\ T \end{bmatrix} + \begin{bmatrix} G \\ 0_{3\times 3} \end{bmatrix}, \quad (1)$$

wherein m is a total mass of the aerial vehicle, I is a 3×3 identity matrix, J is a rotational inertia matrix of the aerial vehicle, v and w are a velocity vector and an angular velocity vector of the aerial vehicle in a ground coordinate system, F and G are an axial component vector of an output resultant force of the motors of the aerial vehicle and an axial component vector of gravity of the aerial vehicle, respectively, and T is a rotational torque vector of the aerial vehicle;

establishing a ground coordinate system $X_G$ and an aerial vehicle body coordinate system $X_U$, wherein the ground coordinate system and the body coordinate system have the following relationship: $U_G = KX_G$, in which conversion relationship, K is a rotation conversion matrix between the ground coordinate system and the body coordinate system, which can be expressed as $$K = \begin{bmatrix} C_\theta C_\psi & C_\theta S_\psi & -S_\theta \\ S_\phi S_\theta C_\psi & S_\phi S_\theta S_\psi + C_\phi S_\psi & S_\phi C_\theta \\ S_\phi S_\theta C_\psi - C_\phi S_\psi & C_\phi S_\theta S_\psi - S_\theta C_\psi & C_\theta C_\phi \end{bmatrix},$$

wherein $C_\theta$ represents cos θ(t), $S_\theta$ represents sin θ(t), θ(t) is the pitch angle, ψ(t) is the yaw angle, and φ(t) is the roll angle;

according to the coordinate conversion theory, in a translation direction and a rotation direction of the aerial vehicle, basing on the above physical model, such that the following dynamics equation in the aerial vehicle body coordinate system can be obtained $$\begin{cases} \ddot{x} = \dfrac{u_1(t)(\cos\phi(t)\sin\theta(t)\cos\psi(t)+\sin\theta(t)\sin\psi(t))}{m} \\ \ddot{y} = \dfrac{u_1(t)(\sin\phi(t)\sin\theta(t)\cos\psi(t)-\sin\psi(t)\cos\psi(t))}{m} \\ \ddot{z} = \dfrac{u_1(t)\cos\theta(t)\cos\phi(t)}{m}-g \\ \ddot{\phi} = \dfrac{l\cdot u_2(t)+(J_y-J_z)\dot{\psi}(t)\dot{\theta}(t)}{J_y} \\ \ddot{\theta} = \dfrac{l\cdot u_3(t)+(J_z-J_x)\dot{\psi}(t)\dot{\phi}(t)}{J_y} \\ \ddot{\psi} = \dfrac{u_4(t)+(J_x-J_y)\dot{\theta}(t)\dot{\phi}(t)}{J_z} \end{cases} \quad (2)$$

wherein x, y, z are position coordinates of the aerial vehicle in the world coordinate system, respectively, $J_x$, $J_y$ and $J_z$ are rotational inertia of the aerial vehicle in x-axis, y-axis and z-axis directions, respectively, l is an arm length, g is gravitational acceleration, synthesized control parameters $u_1 \sim u_4$ consist of output thrust of the motors of the aerial vehicle and a synthesized torque, $u_1(t)$ is a resultant force in a vertical ascending direction of the aerial vehicle, $u_2(t)$ is a resultant force in a roll angle direction, $u_3(t)$ is a resultant force in a pitch angle direction, and $u_4(t)$ is the synthesized torque in a yaw angle direction; wherein the designing a finite-time varying-parameter convergence differential neural network solver for the dynamics model of the multi-rotor aerial vehicle according to a finite-time varying-parameter convergence differential neurodynamics design method of step S2 specifically comprises:

by means of the finite-time varying-parameter convergence differential neurodynamics design method, designing a system parameter deviation function of the finite-time varying-parameter convergence differential neural network about the output control parameters $u_1 \sim u_4$ in respect to the z-axis height z(t), the roll angle φ(t), the pitch angle θ(t) and the yaw angle ψ(t), respectively; and designing the finite-time varying-parameter convergence differential neural network solver according to the obtained system parameter deviation function of the finite-time varying-parameter convergence differential neural network about the output control parameters $u_1 \sim u_4$, respectively.

2. The stable flight control method for a multi-rotor A unmanned aerial vehicle based on finite-time neurodynamics of claim 1, wherein the step of by means of the finite-time varying-parameter convergence differential neurodynamics design method, designing a system parameter deviation function of the finite-time varying-parameter convergence differential neural network about the output control parameters $u_1 \sim u_4$ in respect to the z-axis height z(t), the roll angle φ(t), the pitch angle θ(t) and the yaw angle ψ(t), respectively, specifically comprises:

S201, for the z-axis height z(t), according to a set target height value and an actual height value $z_T(t)$ in the z-axis direction, defining a deviation function $e_{z1}$ about the actual height value z(t) on a position layer as follows: $e_{z1}(t)=z(t)-z_T(t)$, in order to enable the actual value z(t) to converge to the time-varying target value $z_T(t)$, designing a neurodynamics equation $\dot{e}_{z1}(t)=-\gamma(t)\Phi(e_{z1}(t),t)$ based on a deviation function according to the finite-time varying-parameter convergence differential neurodynamics design method, wherein $\gamma(t)=p+t^p$ is a time-varying parameter representing a regulatory factor for the rate of convergence;

$$\Phi(e_{z1}(t), t) = k_1|e_{z1}(t)|^r\mathrm{sign}(e_{z1}(t)) + k_2 e_{z1}(t) + k_3|e_{z1}(t)|^{\frac{1}{r}}\mathrm{sign}(e_{z1}(t))$$

according to the deviation function $e_{z1}(t)=z(t)-z_T(t)$, $\dot{e}_{z1}=\dot{z}(t)-\dot{z}_T(t)$ can be obtained; by substituting $e_{z1}(t)=z(t)-z_T(t)$ and $\dot{e}_{z1}=\dot{z}(t)-\dot{z}_T(t)$ into $\dot{e}_{z1}(t)=-\gamma(t)\Phi(e_{z1}(t),t)$, we can obtain $$\dot{z}(t)-\dot{z}_T(t)+(t^p+p)\Phi(e_{z1}(t),t)=0; \quad (3)$$

the position layer z(t) can converge to the time-varying target value $z_T(t)$ in a super-exponential manner within a finite time, however, since equation (3) does not contain relevant information about the control parameters $u_1 \sim u_4$, the solution of the control parameters cannot be realized, therefore, it is necessary to further design the deviation function including a velocity layer $\dot{z}(t)$ and an acceleration layer $\ddot{z}(t)$, thus defining $e_{z2}(t)=\dot{z}(t)-\dot{z}_T(t)+(t^p+p)\Phi(e_{z1}(t),t)$; according to the finite-time varying-parameter convergence differential neural network design method, the dynamics equation $\dot{e}_{z2}(t)=-\gamma(t)\Phi(e_{z2}(t),t)$ based on the deviation function can be designed, $$\Phi(e_{z2}(t), t) = k_1|e_{z2}(t)|^r\mathrm{sign}(e_{z2}(t)) + k_2 e_{z2}(t) + k_3|e_{z2}(t)|^{\frac{1}{r}}\mathrm{sign}(e_{z2}(t))$$

according to $e_{z2}(t)=\dot{z}(t)-\dot{z}_T(t)+(t^p+p)\Phi(e_{z1}(t),t)$, the derivative $\dot{e}_{z2}(t)$ of the deviation function $e_{z2}(t)$ is known as: $\dot{e}_{z2}(t)=\ddot{z}(t)-\ddot{z}_T(t)+(p+t^p)\dot{\Phi}(e_{z1}(t),t)+pt^{p-1}\Phi(e_{z1}(t),t)$, by substituting the above equations about $e_{z2}(t)$ and $\dot{e}_{z2}(t)$ into the equation $\dot{e}_{z2}(t)=-\gamma(t)\Phi(e_{z2}(t),t)$ the following function can be obtained:

$$\ddot{z}(t)-\ddot{z}_T(t)+(p+t^p)\dot{\Phi}(e_{z1}(t),t)+\Phi(e_{z2}(t),t)+pt^{p-1}\Phi(e_{z1}(t),t)=0 \quad (4)$$

when equation (4) is established, the velocity layer $\dot{z}(t)$ will converge to $\bar{z}_T(t)$ within finite time in a super-exponential manner, according to which the deviation function can be considered $$E_z(t)=\ddot{z}(t)-\ddot{z}_T(t)+(p+t^p)\dot{\Phi}(e_{z1}(t),t)+\Phi(e_{z2}(t),t)+pt^{p-1}\Phi(e_{z1}(t),t) \quad (5)$$

in order to obtain an actual model of the neural network, in combination with kinetic equation (2), equation (5) can be rewritten into $$E_z(t)=a_z(t)u_1(t)+b_z(t), \quad (6)$$

$$a_z(t) = \dfrac{\cos\theta(t)\cos\phi(t)}{m},$$

wherein
$b_z(t)=-g-\ddot{z}_T(t)+(p+t^p)\dot{\Phi}(e_{z1}(t),t)+pt^{p-1}\Phi(e_{z1}(t),t)+(p+t^p)\Phi(e_{z2}(t),t)$ that is, the deviation function about the output control parameter $u_1(t)$ is obtained;

S202, for the roll angle φ(t), in order to reach a target angle $\phi_T(t)$, first defining an error function $e_{\phi1}=\phi(t)-\phi_T(t)$, such that we can obtain $\dot{e}_{\phi1}=\dot{\phi}(t)-\dot{\phi}_T(t)$; since the solution is in an angle layer, according to the finite-time varying-parameter differential neurodynamics design method, we can obtain $\dot{e}_{\phi1}=-\gamma(t)\Phi(e_{\phi1}(t),t)$, $$\Phi(e_{\phi 1}(t), t) = k_1 |e_{\phi 1}(t)|^r \text{sign}(e_{\phi 1}(t)) + k_2 e_{\phi 1}(t) + k_3 |e_{\phi 1}(t)|^{\frac{1}{r}} \text{sign}(e_{\phi 1}(t));$$

by substituting the error function $e_{\phi 1}(t)=\phi(t)-\phi_T(t)$ and $\dot{e}_{\phi 1}=\dot{\phi}(t)-\dot{\phi}_T(t)$ into the equation $\dot{e}_{\phi 1}(t)=-\gamma(t)\Phi(e_{\phi 1}(t),t)$, we can obtain $$\dot{\phi}(t)-\dot{\phi}_T(t)+(t^p+p)\Phi(e_{\phi 1}(t),t)=0, \quad (7)$$

$\phi(t)$ will converge to the target angle $\phi_T(t)$ in a super-exponential manner within finite time; since $\ddot{\phi}(t)$ is known, it is necessary to solve the equation involving $\ddot{\phi}(t)$; in order to obtain the equation involving $\ddot{\phi}(t)$, the error function $e_{\phi 2}=\dot{\phi}(t)-\dot{\phi}_T(t)+(t^p+p)\Phi(e_{\phi 1}(t),t)$ is set by the same method and $\dot{e}_{\phi 2}(t)=\ddot{\phi}(t)-\ddot{\phi}_T(t)+(p+t^p)\dot{\Phi}(e_{\phi 1}(t),t)+pt^{p-1}\Phi(e_{\phi 1}(t),t)$, $$\Phi(e_{\phi 2}(t), t) = k_1 |e_{\phi 2}(t)|^r \text{sign}(e_{\phi 2}(t)) + k_2 e_{\phi 2}(t) + k_3 |e_{\phi 2}(t)|^{\frac{1}{r}} \text{sign}(e_{\phi 2}(t));$$

by substituting the above equations of $e_{\phi 2}(t)$ and $\dot{e}_{\phi 2}(t)$ into $\dot{e}_{\phi 2}(t)=-\gamma(t)\Phi(e_{\phi 2}(t),t)$ the following function can be obtained:

$$\ddot{\phi}(t)-\ddot{\phi}_T(t)+(p+t^p)\dot{\Phi}(e_{\phi 1}(t),t)+\Phi(e_{\phi 2}(t),t)+pt^{p-1}\Phi(e_{\phi 1}(t),t)=0 \quad (8)$$

when equation (8) is established, the velocity layer $\dot{\phi}(t)$ will converge to $\dot{\phi}_T(t)$ within finite time in a super-exponential manner, according to which the deviation function can be considered $$E_\phi = \ddot{\phi}(t)-\ddot{\phi}_T(t)+(p+t^p)\dot{\Phi}(e_{\phi 1}(t),t)+\Phi(e_{\phi 2}(t),t)+pt^{p-1}\Phi(e_{\phi 1}(t),t) \quad (9)$$

when the aerial vehicle reaches a target state, according to the dynamics model equation, the deviation function can be converted into $$E_\phi(t) = \frac{l}{J_x} u_2(t) + b_\phi(t), \quad (10)$$

wherein $$b_\phi(t) = \frac{(J_y - J_z)\dot{\psi}(t)\dot{\theta}(t)}{J_x} - \ddot{\phi}_T(t) + (p + t^p)\dot{\Phi}(e_{\phi 1}(t), t) + pt^{p-1}\Phi(e_{\phi 1}(t), t) + (p + t^p)(\Phi(e_{\phi 2}(t), t))$$

that is, the deviation function about the output control parameter $u_2(t)$ is obtained;

S203, for the pitch angle $\theta(t)$, in order to reach a target angle $\theta_T(t)$, first defining an error function $e_{\theta 1}=\theta(t)-\theta_T(t)$, such that we can obtain $\dot{e}_{\theta 1}=\dot{\theta}(t)-\dot{\theta}_T(t)$; since the solution is in an angle layer, according to the finite-time varying-parameter differential neurodynamics design method, we can obtain $\dot{e}_{\theta 1}(t)=-\gamma(t)\Phi(e_{\theta 1}(t),t)$, $$\Phi(e_{\theta 1}(t), t) = k_1 |e_{\theta 1}(t)|^r \text{sign}(e_{\theta 1}(t)) + k_2 e_{\theta 1}(t) + k_3 |e_{\theta 1}(t)|^{\frac{1}{r}} \text{sign}(e_{\theta 1}(t));$$

by substituting the error function $e_{\theta 1}(t)$ and $\dot{e}_{\theta 1}(t)$ into the equation $\dot{e}_{\theta 1}(t)=-\gamma(t)\Phi(e_{\theta 1}(t),t)$, we can obtain $$\dot{\theta}(t)-\dot{\theta}_T(t)+(t^p+p)\Phi(e_{\theta 1}(t),t)=0, \quad (11)$$

$\theta(t)$ will converge to the target angle $\theta_T(t)$ in a super-exponential manner within finite time; since $\ddot{\theta}(t)$ is known, it is necessary to solve the equation involving $\ddot{\theta}(t)$; in order to obtain the equation involving $\ddot{\theta}(t)$, the error function $e_{\theta 2}=\dot{\theta}(t)-\dot{\theta}_T(t)+(t^p+p)\Phi(e_{\theta 1}(t),t)$ is set by the same method and $\dot{e}_{\theta 2}(t)=\ddot{\theta}(t)-\ddot{\theta}_T(t)+(p+t^p)\dot{\Phi}(e_{\theta 1}(t),t)+pt^{p-1}\Phi(e_{\theta 1}(t),t)$, $$\Phi(e_{\theta 2}(t), t) = k_1 |e_{\theta 2}(t)|^r \text{sign}(e_{\theta 2}(t)) + k_2 e_{\theta 2}(t) + k_3 |e_{\theta 2}(t)|^{\frac{1}{r}} \text{sign}(e_{\theta 2}(t));$$

by substituting the above equations of $e_{\theta 2}(t)$ and $\dot{e}_{\theta 2}(t)$ into the equation $\dot{e}_{\theta 2}(t)=-\gamma(t)\Phi(e_{\theta 2}(t),t)$, the following function can be obtained:

$$\ddot{\theta}(t)-\ddot{\theta}_T(t)+(p+t^p)\dot{\Phi}(e_{\theta 1}(t),t)+\Phi(e_{\theta 2}(t),t)+pt^{p-1}\Phi(e_{\theta 1}(t),t)=0 \quad (12)$$

when equation (12) is established, the velocity layer $\dot{\theta}(t)$ will converge to $\dot{\theta}_T(t)$ within finite time in a super-exponential manner, according to which the deviation function can be considered $$E_\theta(t)=\ddot{\theta}(t)-\ddot{\theta}_T(t)+(p+t^p)\dot{\Phi}(e_{\theta 1}(t),t)+\Phi(e_{\theta 2}(t),t)+pt^{p-1}\Phi(e_{\theta 1}(t),t) \quad (13)$$

when the aerial vehicle reaches a target state, according to the dynamics model equation, the deviation function can be converted into $$E_\theta(t) = \frac{l}{J_y} u_3(t) + b_\theta(t), \quad (14)$$

wherein $$b_\theta(t) = \frac{(J_z - J_x)\dot{\psi}(t)\dot{\phi}(t)}{J_y} - \ddot{\theta}_T(t) + (p + t^p)\dot{\Phi}(e_{\theta 1}(t), t) + pt^{p-1}\Phi(e_{\theta 1}(t), t) + (p + t^p)(\Phi(e_{\theta 1}(t), t)),$$

that is, the deviation function about the output control parameter $u_3(t)$ is obtained; and S204, for the yaw angle $\psi(t)$, in order to reach a target angle $\psi_T(t)$, first defining an error function $e_{\psi 1}=\psi(t)-\psi_T(t)$, such that we can obtain $\dot{e}_{\psi 1}=\dot{\psi}(t)-\dot{\psi}_T(t)$; since the solution is in an angle layer, according to the finite-time varying-parameter differential neurodynamics design method, we can obtain $\dot{e}_{\psi 1}(t)=-\gamma(t)\Phi(e_{\psi 1}(t),t)$, $$\Phi(e_{\psi 1}(t), t) = k_1 |e_{\psi 1}(t)|^r \text{sign}(e_{\psi 1}(t)) + k_2 e_{\psi 1}(t) + k_3 |e_{\psi 1}(t)|^{\frac{1}{r}} \text{sign}(e_{\psi 1}(t));$$

by substituting the error function $e_{\psi 1}(t)$ and $\dot{e}_{\psi 1}(t)$ into the equation $\dot{e}_{\psi 1}(t)=-\gamma(t)\Phi(e_{\psi 1}(t),t)$, we can obtain $$\dot{\psi}(t)-\dot{\psi}_T(t)+(t^p+p)\Phi(e_{\psi 1}(t),t)=0 \quad (15)$$

$\psi(t)$ will converge to the target angle $\psi_T(t)$ in a super-exponential manner within finite time; since $\ddot{\psi}(t)$ is known, it is necessary to solve the equation involving $\ddot{\psi}(t)$; in order to obtain the equation involving $\ddot{\psi}(t)$, the error function $e_{\psi 2}=\dot{\psi}(t)-\dot{\psi}_T(t)+(t^p+p)\Phi(e_{\psi 1}(t),t)$ is set by the same method and $$\dot{e}_{\psi 2}(t) = \ddot{\psi}(t) - \ddot{\psi}_T(t) + (p + t^p)\Phi(e_{\psi 1}(t), t) + pt^{p-1}\Phi(e_{\psi 1}(t), t),$$

$$\Phi(e_{\psi 2}(t), t) = k_1|e_{\psi 2}(t)|^r \text{sign}(e_{\psi 2}(t)) + k_2 e_{\psi 2}(t) + k_3|e_{\psi 2}(t)|^{\frac{1}{r}} \text{sign}(e_{\psi 2}(t));$$

by substituting the above equations of $e_{\psi 2}(t)$ and $\dot{e}_{\psi 2}(t)$ into $\dot{e}_{\psi 2}(t) = -\gamma(t)\Phi(e_{\psi 2}(t),t)$, the following function can be obtained:

$$\ddot{\psi}(t) - \ddot{\psi}_T(t) + (p+t^p)\dot{\Phi}(e_{\psi 1}(t),t) + \Phi(e_{\psi 2}(t),t) + pt^{p-1}\Phi(e_{\psi 1}(t),t) = 0 \quad (16)$$

when equation (16) is established, the velocity layer $\dot{\psi}(t)$ will converge to $\dot{\psi}_T(t)$ within finite time in a super-exponential manner, according to which the deviation function can be considered $$E_\psi(t) = \dot{\psi}(t) - \dot{\psi}_T(t) + (p+t^p)\Phi(t),t) + \Phi(e_{\psi 2}(t),t) + pt^{p-1}\Phi(e_{\psi 1}(t),t) \quad (17)$$

when the aerial vehicle reaches a target state, according to the dynamics model equation, the deviation function can be converted into $$E_\psi(t) = \frac{l}{J_z} u_4(t) + b_\psi(t), \quad (18)$$

wherein $$b_\psi(t) = \frac{(J_x - J_y)\dot{\phi}(t)\dot{\theta}(t)}{J_z} - \ddot{\psi}_T(t) +$$

$$(p+t^p)\dot{\Phi}(e_{\psi 1}(t), t) + pt^{p-1}\Phi(e_{\psi 1}(t), t) + (p+t^p)(\Phi(e_{\psi 2}(t), t)),$$

that is, the deviation function about the output control parameter $u_4(t)$ is obtained.

3. The stable flight control method for a multi-rotor unmanned aerial vehicle based on finite-time neurodynamics of claim 2, wherein the step of designing the finite-time varying-parameter convergence differential neural network solver according to the obtained system parameter deviation function of the finite-time varying-parameter convergence differential neural network about the output control parameters $u_1 \sim u_4$, respectively, specifically comprises:

S211, for the z-axis height $z(t)$, by using the finite-time varying-parameter convergence differential neural network design method, designing $\dot{E}_z(t) = -\gamma(t)\Phi(E_z(t),t)$, and substituting equation (6) and the derivative $\dot{E}_z(t) = \dot{a}_z(t)u_1(t) + a_z(t)\dot{u}_1(t) + \dot{b}_z(t)$, so that an implicit dynamics equation of the finite-time varying-parameter convergence differential neural network can be obtained:

$$a_z(t)\dot{u}_1(t) = -(\dot{a}_z(t)u_1(t) + \dot{b}_z(t) + \gamma(t)\Phi(E_z(t),t)) \quad (19)$$

the position $z(t)$ and velocity $\dot{z}(t)$ will converge to a target position $z_T(t)$ and a target velocity $\dot{z}_T(t)$, respectively, in a super-exponential manner within finite time;

S212, for the roll angle $\phi(t)$, according to the finite-time varying-parameter convergence differential neurodynamics design method, designing $\dot{E}_\phi(t) = -\gamma(t)\Phi(E_\phi(t),t)$, and substituting equation (10) and its derivative $$\dot{E}_\phi(t) = \frac{l}{J_x}\dot{u}_1(t) + \dot{b}_\phi(t),$$

so that an implicit dynamics equation of the finite-time varying-parameter convergence differential neural network can be obtained:

$$\frac{l}{J_x}\dot{u}_2(t) = -(\dot{b}_\phi(t) + \gamma(t)\Phi(E_\phi(t), t)) \quad (20)$$

the roll angle $\phi(t)$ and velocity $\dot{\phi}(t)$ will converge to a target position $\phi_T(t)$ and a target velocity $\dot{\phi}_T(t)$, respectively, in a super-exponential manner within finite time;

S213, for the pitch angle $\theta(t)$, according to the finite-time varying-parameter convergence differential neurodynamics design method, designing $\dot{E}_\theta(t) = -\gamma(t)\Phi(E_\theta(t),t)$, and substituting equation (14) and its derivative $$\dot{E}_\theta(t) = \frac{l}{J_y}\dot{u}_3(t) + \dot{b}_\theta(t),$$

so that an implicit dynamics equation of the finite-time varying-parameter convergence differential neural network can be obtained:

$$\frac{l}{J_y}\dot{u}_3(t) = -(\dot{b}_\theta(t) + \gamma(t)\Phi(E_\theta(t), t)) \quad (21)$$

the pitch angle $\theta(t)$ and velocity $\dot{\phi}(t)$ will converge to a target position $\theta_T(t)$ and a target velocity $\dot{\theta}_T(t)$, respectively, in a super-exponential manner within finite time;

S214, for the yaw angle $\psi(t)$, according to the finite-time varying-parameter convergence differential neurodynamics design method, designing $\dot{E}_\psi(t) = -\gamma(t)\Phi(E_\psi(t),t)$, and substituting equation (18) and its derivative $$\dot{E}_\psi(t) = \frac{1}{J_z}\dot{u}_4(t) + \dot{b}_\psi(t),$$

so that an implicit dynamics equation of the finite-time varying-parameter convergence differential neural network can be obtained:

$$\frac{1}{J_z}\dot{u}_4(t) = -(\dot{b}_\psi(t) + \gamma(t)\Phi(E_\psi(t), t)) \quad (22)$$

the pitch angle $\psi(t)$ and velocity $\dot{\psi}(t)$ will converge to a target position $\psi_T(t)$ and a target velocity $\dot{\psi}_T(t)$, respectively, in a super-exponential manner within finite time; and S215, solving the synthesized control parameters $u_1 \sim u_4$ which is the control parameters corresponding to the flight demand of the aerial vehicle, according to equations (19), (20), (21) and (22), obtaining the neural network equations of the control parameters $u_1 \sim u_4$ respectively as follows:

$$\begin{cases} \dot{u}_1(t) = \dfrac{-(\dot{a}_z(t)u_1(t) + \dot{b}_z(t) + \gamma(t)\Phi(E_z(t), t))}{a_z(t)} \\ \dot{u}_2 = -(b_\phi(t) + \gamma(t)\Phi(E_\phi(t), t))\dfrac{J_x}{l} \\ \dot{u}_3 = -(b_\theta(t) + \gamma(t)\Phi(E_\theta(t), t))\dfrac{J_y}{l} \\ \dot{u}_4 = -(b_\psi(t) + \gamma(t)\Phi(E_\psi(t), t))J_z \end{cases} \quad (23)$$

and performing different output control assignments with the solved control parameters $u_1 \sim u_4$ according to the structure of and the number of motors of different rotor aerial vehicles.

\* \* \* \* \*